US010542409B2

(12) United States Patent
Gholmieh et al.

(10) Patent No.: US 10,542,409 B2
(45) Date of Patent: Jan. 21, 2020

(54) ACCESS FOR GROUP CALL SERVICES THROUGH A BROADCAST CHANNEL

(71) Applicant: QUALCOMM Incorporated, San Diego, CA (US)

(72) Inventors: Ralph Akram Gholmieh, San Diego, CA (US); Kuo-Chun Lee, San Diego, CA (US); Nagaraju Naik, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 88 days.

(21) Appl. No.: 15/727,453

(22) Filed: Oct. 6, 2017

(65) Prior Publication Data

US 2018/0103364 A1 Apr. 12, 2018

Related U.S. Application Data

(60) Provisional application No. 62/405,797, filed on Oct. 7, 2016.

(51) Int. Cl.
| | |
|---|---|
| *H04W 8/00* | (2009.01) |
| *H04W 4/06* | (2009.01) |
| *H04W 40/24* | (2009.01) |
| *H04L 29/08* | (2006.01) |

(52) U.S. Cl.
CPC .............. *H04W 8/005* (2013.01); *H04W 4/06* (2013.01); *H04W 40/246* (2013.01); *H04L 67/16* (2013.01)

(58) Field of Classification Search
CPC ...... H04L 67/16; H04W 40/246; H04W 4/06; H04W 8/005
USPC ......................................................... 370/338
See application file for complete search history.

(56) References Cited

U.S. PATENT DOCUMENTS

| | | | | |
|---|---|---|---|---|
| 2002/0150094 A1* | 10/2002 | Cheng | ................... | H04L 12/185 370/389 |
| 2008/0295140 A1* | 11/2008 | Praden | ............... | H04N 7/17318 725/93 |
| 2009/0161590 A1* | 6/2009 | Lewis | ................. | H04L 12/1836 370/312 |
| 2009/0264064 A1* | 10/2009 | Hyun | ................... | H04L 12/189 455/3.06 |
| 2013/0036234 A1* | 2/2013 | Pazos | ................... | H04L 12/189 709/231 |

(Continued)

FOREIGN PATENT DOCUMENTS

| | | |
|---|---|---|
| WO | 2014169461 A1 | 10/2014 |
| WO | 2016105964 A1 | 6/2016 |

OTHER PUBLICATIONS

International Search Report and Written Opinion—PCT/US2017/055673—ISA/EPO—dated Dec. 7, 2017.

*Primary Examiner* — Robert J Lopata
(74) *Attorney, Agent, or Firm* — Arent Fox, LLP; Kevin M. Donnelly

(57) ABSTRACT

A user equipment (UE) may be configured to join a group call, which may include mission critical (MC) data. The UE may be configured to receive, through a broadcasted group discovery channel (GDCH), a list of group call services and corresponding session description protocol (SDP) information for establishing the group call services. The UE may be configured to determine at least one group call service of the group call services to receive. The UE may be configured to establish the at least one group call service based at least in part on the corresponding SDP information received through the broadcasted GDCH.

30 Claims, 16 Drawing Sheets

(56) References Cited

U.S. PATENT DOCUMENTS

| | | | |
|---|---|---|---|
| 2013/0107786 A1* | 5/2013 | Lotfallah | H04L 65/1016 370/312 |
| 2014/0003417 A1* | 1/2014 | Shauh | H04W 56/001 370/350 |
| 2014/0153474 A1* | 6/2014 | Zhao | H04W 36/0083 370/312 |
| 2014/0201323 A1* | 7/2014 | Fall | H04L 67/10 709/217 |
| 2014/0372624 A1* | 12/2014 | Wang | H04L 65/60 709/231 |
| 2015/0131657 A1* | 5/2015 | Oyman | H04W 56/00 370/390 |
| 2015/0208209 A1* | 7/2015 | Jamadagni | H04W 4/06 370/312 |
| 2015/0304122 A1* | 10/2015 | Pazos | H04L 12/1845 370/312 |
| 2016/0087810 A1* | 3/2016 | Zhang | H04W 4/10 370/312 |
| 2016/0119762 A1* | 4/2016 | Zhu | H04W 76/27 370/312 |
| 2016/0192294 A1* | 6/2016 | Panchal | H04W 52/0225 370/311 |
| 2016/0234806 A1* | 8/2016 | Le Thierry D'Ennequin | H04W 4/06 |
| 2016/0249325 A1* | 8/2016 | Worrall | H04W 72/005 |
| 2016/0301725 A1* | 10/2016 | Bouazizi | H04N 21/241 |
| 2017/0078856 A1* | 3/2017 | Lotfallah | H04W 4/10 |
| 2017/0238148 A1* | 8/2017 | Kolan | H04W 4/06 370/312 |
| 2017/0245117 A1* | 8/2017 | Akesson | H04W 76/10 |
| 2017/0332214 A1* | 11/2017 | Hu | H04W 4/06 |
| 2017/0366363 A1* | 12/2017 | Hong | H04L 12/189 |
| 2018/0242119 A1* | 8/2018 | Ko | H04W 4/08 |
| 2019/0014448 A1* | 1/2019 | Baek | H04W 4/08 |

\* cited by examiner

ACCESS FOR GROUP CALL SERVICES THROUGH A BROADCAST CHANNEL

CROSS-REFERENCE TO RELATED APPLICATION(S)

This application claims the benefit of U.S. Provisional Application Ser. No. 62/405,797, entitled "BOOTSTRAP AND ACCESS FOR GROUP CALLS OVER MULTIMEDIA BROADCAST MULTICAST SERVICE" and filed on Oct. 7, 2016, which is expressly incorporated by reference herein in its entirety.

BACKGROUND

Field

The present disclosure relates generally to communication systems, and more particularly, to a user equipment configured to receive information carried on a broadcasted group discovery channel that enables the user equipment to access a set of group calls in the network.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method, an apparatus, and a computer-readable medium may be described in the present disclosure. The apparatus may be a user equipment. The apparatus may receive, through a broadcasted group discovery channel (GDCH), a list of group call services and corresponding session description protocol (SDP) information for establishing the group call services. The apparatus may determine at least one group call service of the group call services to receive. The apparatus may establish the at least one group call service based at least in part on the corresponding SDP information received through the broadcasted GDCH. In an aspect, the reception, through the broadcasted GDCH, the list of the group call services and corresponding SDP information for establishing the group call services is based on a TMGI associated with the broadcasted GDCH. In an aspect, the apparatus may send, to a server, a request including a uniform resource locator (URL) indicating a public land mobile network (PLMN) and, further, the apparatus may receive, based on the request, user service description (USD) information indicating the TMGI associated with the broadcasted GDCH. In an aspect, the apparatus may receive, through a service discovery channel, USD information indicating the TMGI associated with the broadcasted GDCH. In an aspect, the SDP information comprises a file associated with a service announcement for the at least one group call service. In an aspect, the SDP information indicates at least one of an address associated with the at least one group call service, a port associated with the at least one group call service, a multimedia broadcast multicast service (MBMS) bearer of the at least one group call service, floor control information of the at least one group call service, or one or more user identifiers of the at least one group call service. In an aspect, the apparatus may receive a map group to bearer message associated with the at least one group call service, wherein the establishment of the at least one group call service is based at least in part on the received map group to bearer message and, further, the apparatus may receive an unmap group to bearer message associated with the at least one group call service, wherein termination of the at least one group call service is based at least in part on the received unmap group to bearer message. In an aspect, at least one of the map group to bearer message or the unmap group to bearer message is received through a general purpose MBMS subchannel of the at least one group call service. In an aspect, the unmap group to bearer message indicates at least one of a source type or a media type of the at least one group call service that is to be unmapped. In an aspect, the map group to bearer message indicates a TMGI of the at least one group call service. In an aspect, the apparatus may receive information associated with the broadcasted GDCH through another GDCH, and the reception, through the broadcasted GDCH, of the list of the group call services and corresponding SDP information for establishing the group call services is based on the information associated with the broadcasted GDCH received through the other GDCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
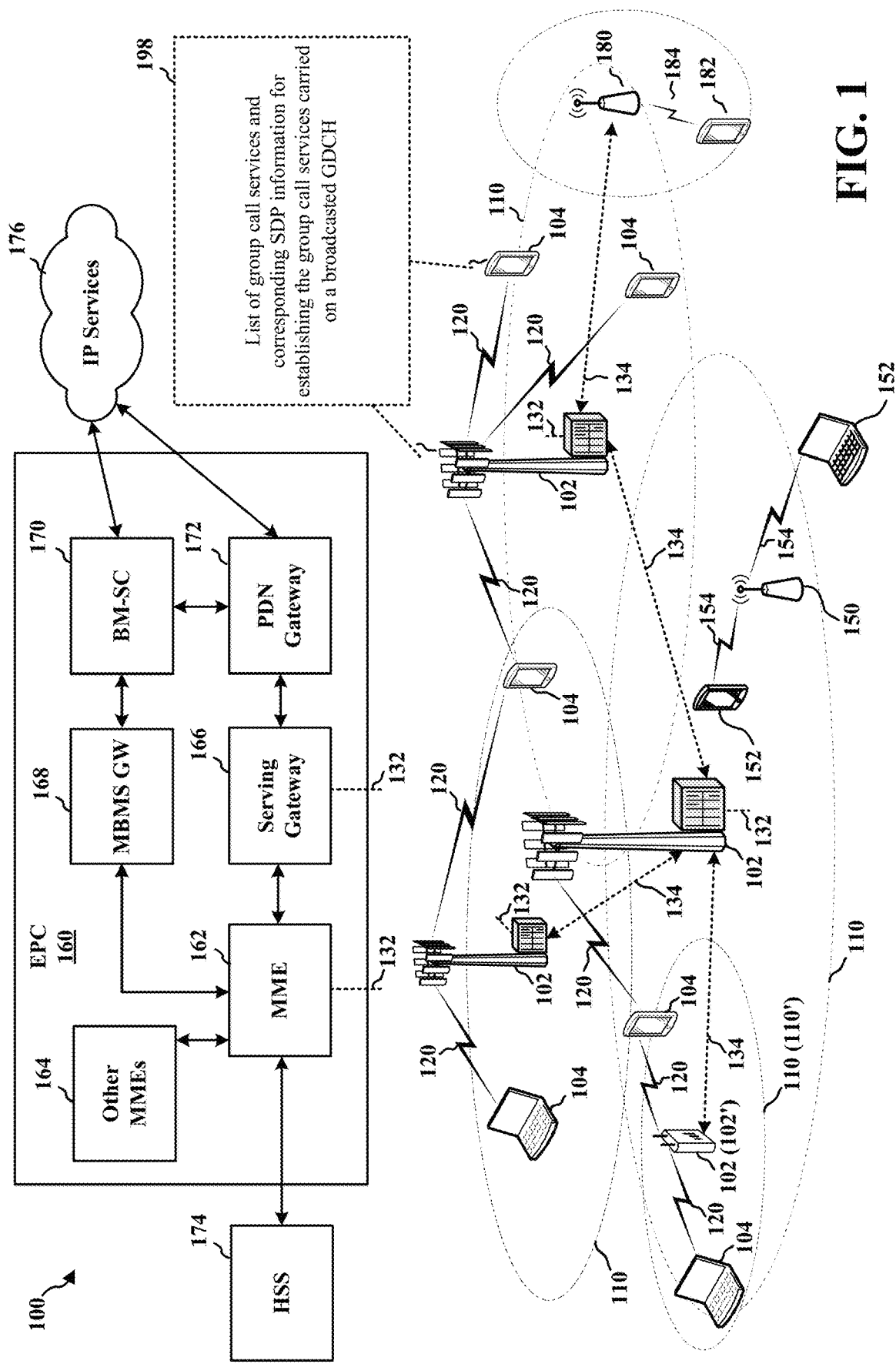
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may receive a list of group call services and corresponding session description protocol (SDP) information for establishing the group call services through a broadcasted group discovery channel (GDCH) 198. The UE 104 may determine at least one group call service of the group call services to receive. The UE 104 may establish the at least one group call service based at least in part on the corresponding SDP information received through the broadcasted GDCH 198. In an aspect, the reception, through the broadcasted GDCH 198, of the list of the group call services and corresponding SDP information for establishing the group call services is based on a TMGI associated with the broadcasted GDCH 198. In an aspect, the UE 104 may send, to a server (e.g., through the base station 102), a request including a uniform resource locator (URL) indicating a public land mobile network (PLMN) and, further, the UE 104 may receive, based on the request, user service description (USD) information indicating the TMGI associated with the broadcasted GDCH 198. In an aspect, the UE 104 may receive, through a service discovery channel, USD information indicating the TMGI associated with the broadcasted GDCH 198. In an aspect, the SDP information comprises a file associated with a service announcement for the at least one group call service. In an aspect, the SDP information indicates at least one of an address associated with the at least one group call service, a port associated with the at least one group call service, a MBMS bearer of the at least one group call service, floor control information of the at least one group call service, or one or more user identifiers of the at least one group call service. In an aspect, the UE 104 may receive a map group to bearer message associated with the at least one group call service, and the establishment of the at least one group call service is based at least in part on the received map group to bearer message and, further, the UE 104 may receive an unmap group to bearer message associated with the at least one group call service, wherein termination of the at least one group call service is based at least in part on the received unmap group to bearer message. In an aspect, at least one of the map group to bearer message or the unmap group to bearer message is received through a general purpose MBMS subchannel of the at least one group call service. In an aspect, the unmap group to bearer message indicates at least one of a source type or a media type of the at least one group call service that is to be unmapped. In an aspect, the map group to bearer message indicates a TMGI of the at least one group call service. In an aspect, the UE 104 may receive information associated with the broadcasted GDCH 198 through another GDCH, and the reception, through the broadcasted GDCH 198, of the list of the group call services and corresponding SDP information for establishing the group call services is based on the information associated with the broadcasted GDCH 198 received through the other GDCH.

Figure 2A:
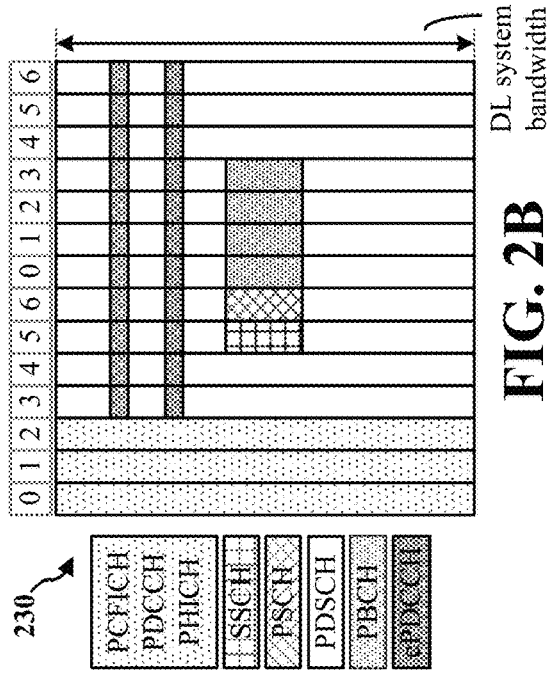
FIGS. 2A, 2B, 2C, and 2D are diagrams illustrating LTE examples of a DL frame structure, DL channels within the DL frame structure, an UL frame structure, and UL channels within the UL frame structure, respectively.
Figure 2B:
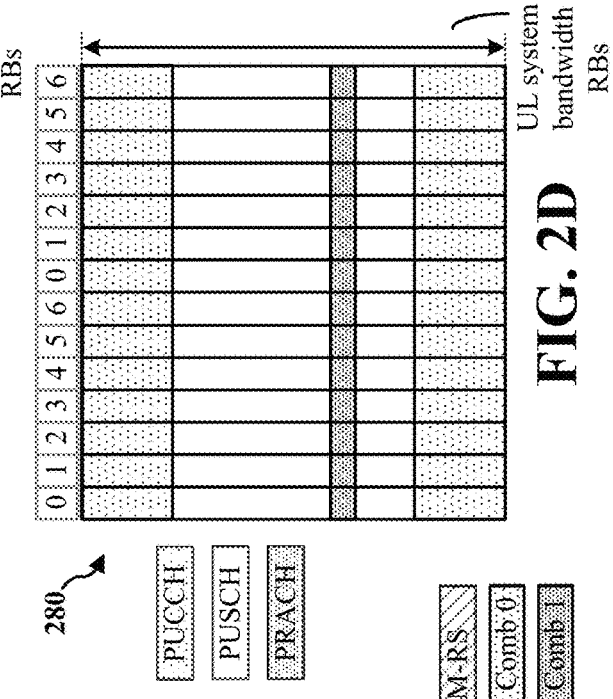
Figure 2C:
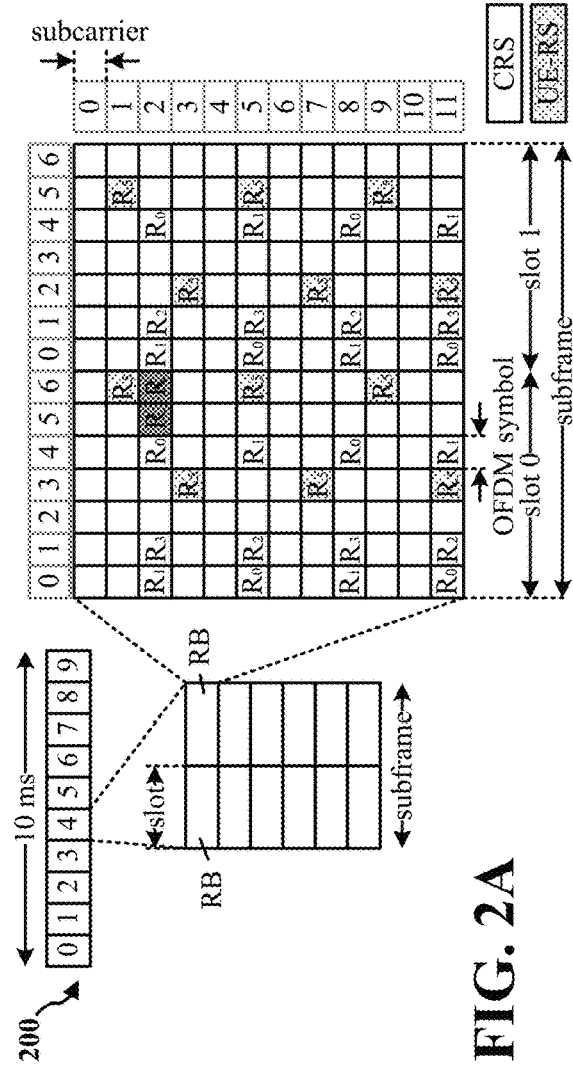
Figure 2D:
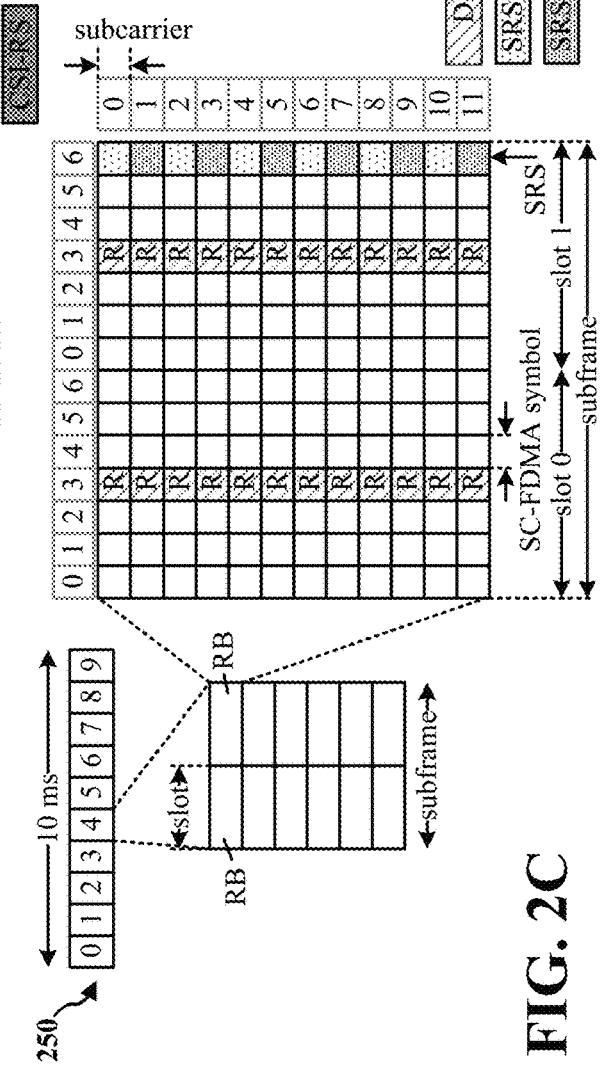

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
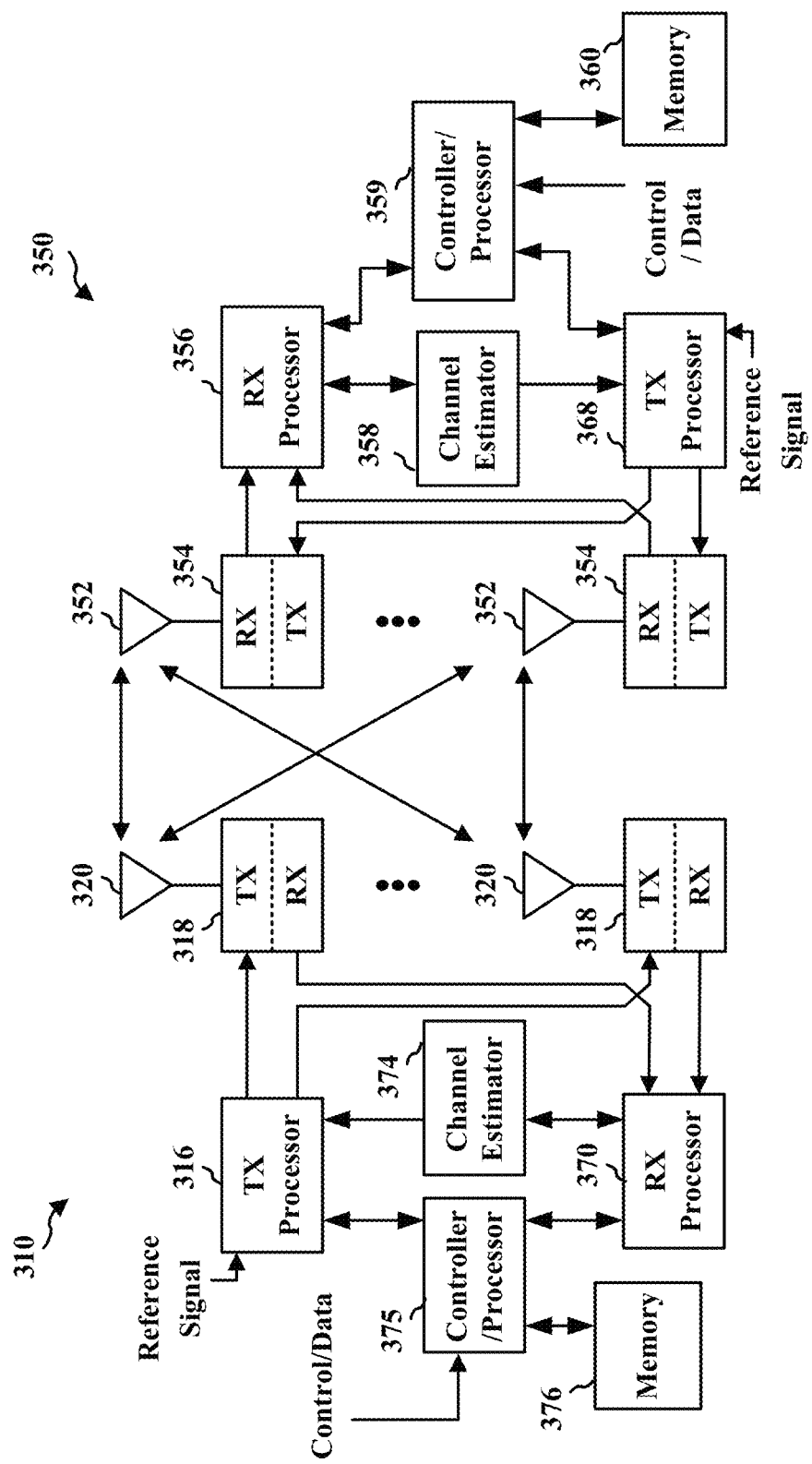
FIG. 3 is a diagram illustrating an example of an evolved Node B (eNB) and a user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
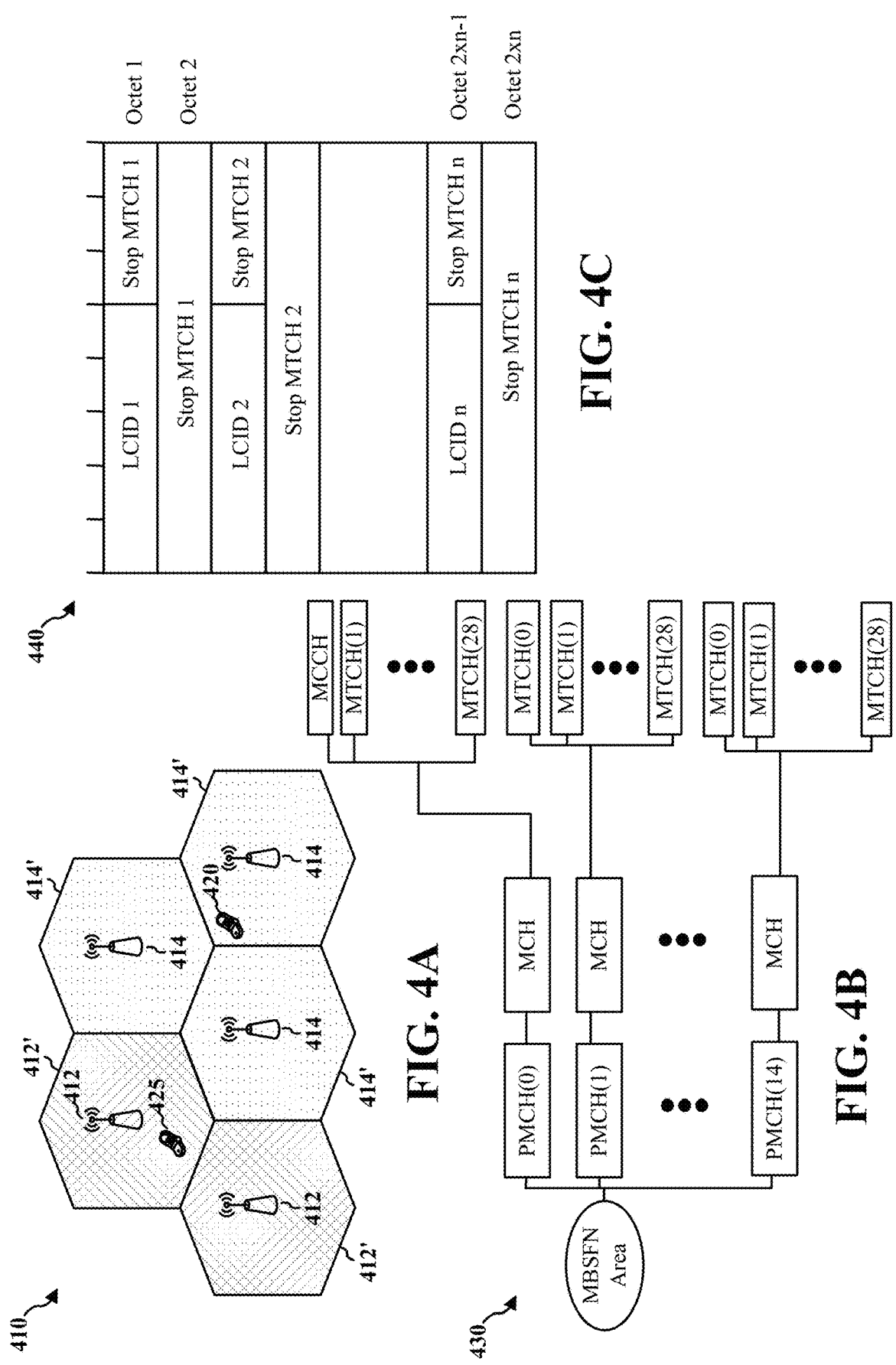
FIG. 4A is a diagram illustrating an example of Multicast Broadcast Single Frequency Network areas in an access network.
FIG. 4B is a diagram illustrating an example of an evolved Multimedia Broadcast Multicast Service channel configuration in a Multicast Broadcast Single Frequency Network.
FIG. 4C is a diagram illustrating a format of a Multicast Channel (MCH) Scheduling Information (MSI) Medium Access Control element.

FIG. 4A is a diagram 410 illustrating an example of MBSFN areas in an access network. The eNBs 412 in cells 412' may form a first MBSFN area and the eNBs 414 in cells 414' may form a second MBSFN area. The eNBs 412, 414 may each be associated with other MBSFN areas, for example, up to a total of eight MBSFN areas. A cell within an MBSFN area may be designated a reserved cell. Reserved cells do not provide multicast/broadcast content, but are time-synchronized to the cells 412', 414' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 4A, the first MBSFN area may support a first eMBMS broadcast service, such as by providing a particular news broadcast to UE 425. The second MBSFN area may support a second eMBMS broadcast service, such as by providing a different news broadcast to UE 420.

FIG. 4B is a diagram 430 illustrating an example of an eMBMS channel configuration in an MBSFN. As shown in FIG. 4B, each MBSFN area supports one or more physical multicast channels (PMCH) (e.g., 15 PMCHs). Each PMCH corresponds to an MCH. Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. Initially, the UE may acquire a SIB 13 (SIB13). Subsequently, based on the SIB13, the UE may acquire an MBSFN Area Configuration message on an MCCH. Subsequently, based on the MBSFN Area Configuration message, the UE may acquire an MSI MAC control element. The SIB13 may include (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted. A particular TMGI identifies a particular service of available MBMSs services.

FIG. 4C is a diagram 440 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area. A logical channel identifier (LCD) field (e.g., LCID 1, LCID 2, . . . , LCID n) may indicate a logical channel identifier of the MTCH. A Stop MTCH field (e.g., Stop MTCH 1, Stop MTCH 2, . . . , Stop MTCH n) may indicate the last subframe carrying the MTCH corresponding to the particular LCD.

Figure 5:
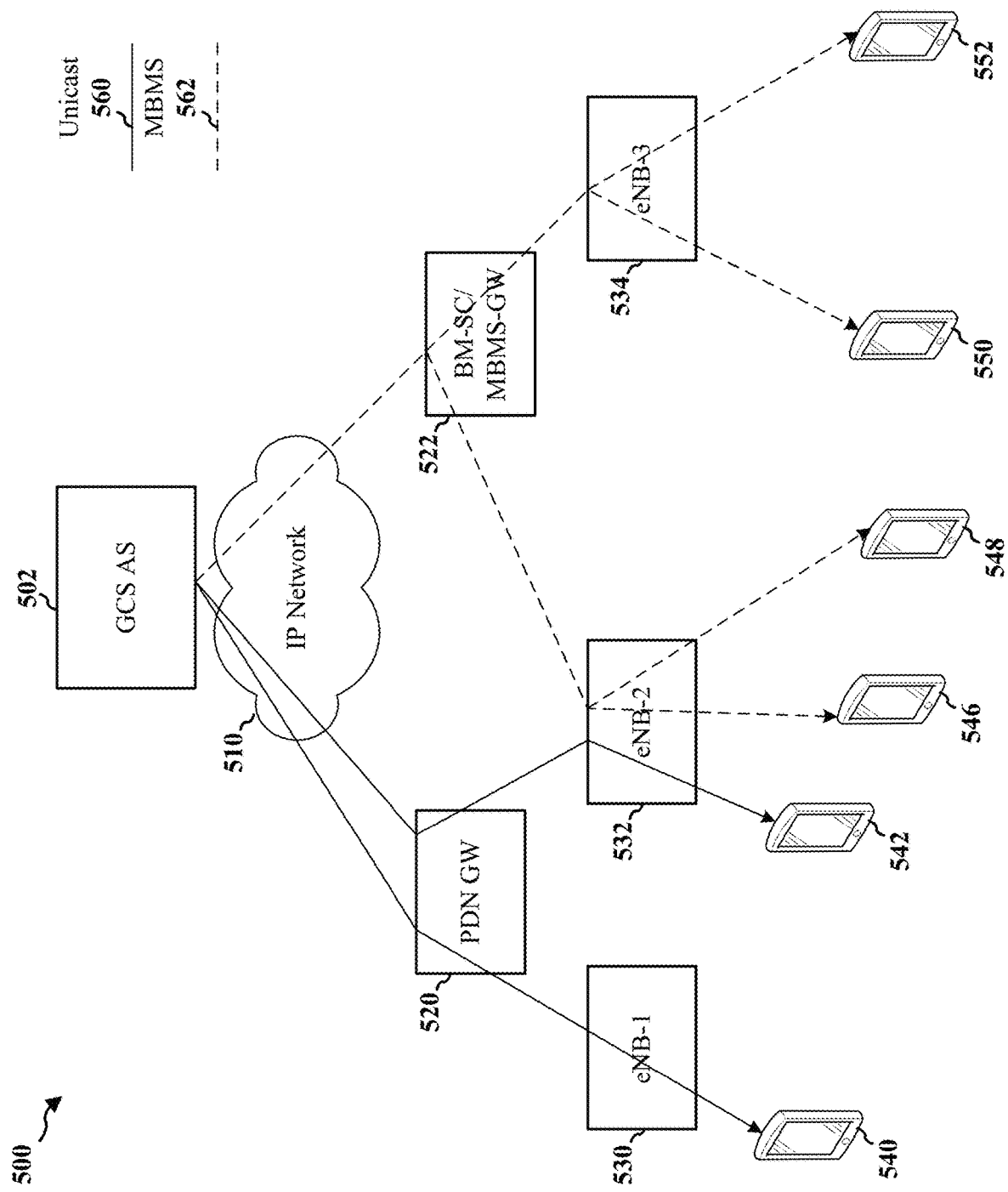
FIG. 5 is a diagram of a wireless communications system.

FIG. 5 is a diagram of a wireless communications system 500. The wireless communications system 500 may include at least a group call system (GCS) application server (AS) 502 configured to communicate over an IP network S10 with a BM-SC (MBMS-GW) 522 (e.g., the BM-SC 170 of FIG. 1) and a PDN GW 520 (e.g., the PDN GW 172 of FIG. 1).

The wireless communications system 500 may include a plurality of UEs 540, 542, 546, 548, 550, 552. Each UE may operate on a cell provided by an eNB. For example, a first UE 540 may operate on a cell provided by a first eNB 530, a fifth UE 550 may operate on a cell provided by a third eNB 534, and so forth. The eNBs 530, 532, 534 may be communicatively coupled with one or both of the PDN GW 520 and/or the BM-SC 522, for example, to provide channels to the UEs 540, 542, 546, 548, 550, 552.

In aspects, group calls may be established through the GCS AS 502 for a UE 540, 542, 546, 548, 550, 552 (e.g., a UE having a group call client), for example, according to one or more 3GPP Technical Specifications (e.g., 3GPP TS 23.468). In aspects, the downlink communication between the GCS AS 502 and a UE 540, 542, 546, 548, 550, 552 may be unicast 560, broadcast (e.g., over MBMS 562), and/or a combination thereof. For example, the GCS AS 502 may transmit downlink data to the first UE 540 over unicast 560, while the GCS AS 502 may transmit downlink data to the fifth UE 550 over MBMS 562. However, a UE may switch between unicast 560 and broadcast (e.g., MBMS 562). Note that broadcast may be achieved over an MBSFN or through SC-PTM (single cell point-to-multipoint).

The GCS AS 502 and a UE 540, 542, 546, 548, 550, 552 may communicate using a GC1 interface. The GC1 interface may be an interface between server (e.g., GCS AS 502) and client (e.g., the first UE 540, the fifth UE 550, etc.). Specifically, the GC1 interface may be an interface between an application in a UE (e.g., the first UE 540, the fifth UE 550, etc.) and the GCS AS 502 to allow application-level control signaling, such as group management, floor control, relay of MBMS-specific bearer configuration data received from the BM-SC 522, and so forth.

In some aspects, group call discovery is performed over unicast 560, and a UE (e.g., the first UE 540, the fifth UE 550, etc.) may transition to MBMS 562 after discovery of a group call. In another aspect, a UE (e.g., the first UE 540, the fifth UE 550, etc.) may be configured for bootstrap access to group call discovery, which may be carried on a specific channel: a GDCH. In an aspect, the fifth UE 550 may be informed about ongoing group call services through the GDCH. The fifth UE 550 may join such group call services without the need for starting in unicast. The fifth UE 550 may then establish a connection to the ongoing broadcast services (identified through the GDCH) without the need to establish a unicast connection to the GCS AS 502. Various aspects of access to group call services based at least in part on information carried on a GDCH may be discussed herein.

Figure 6:
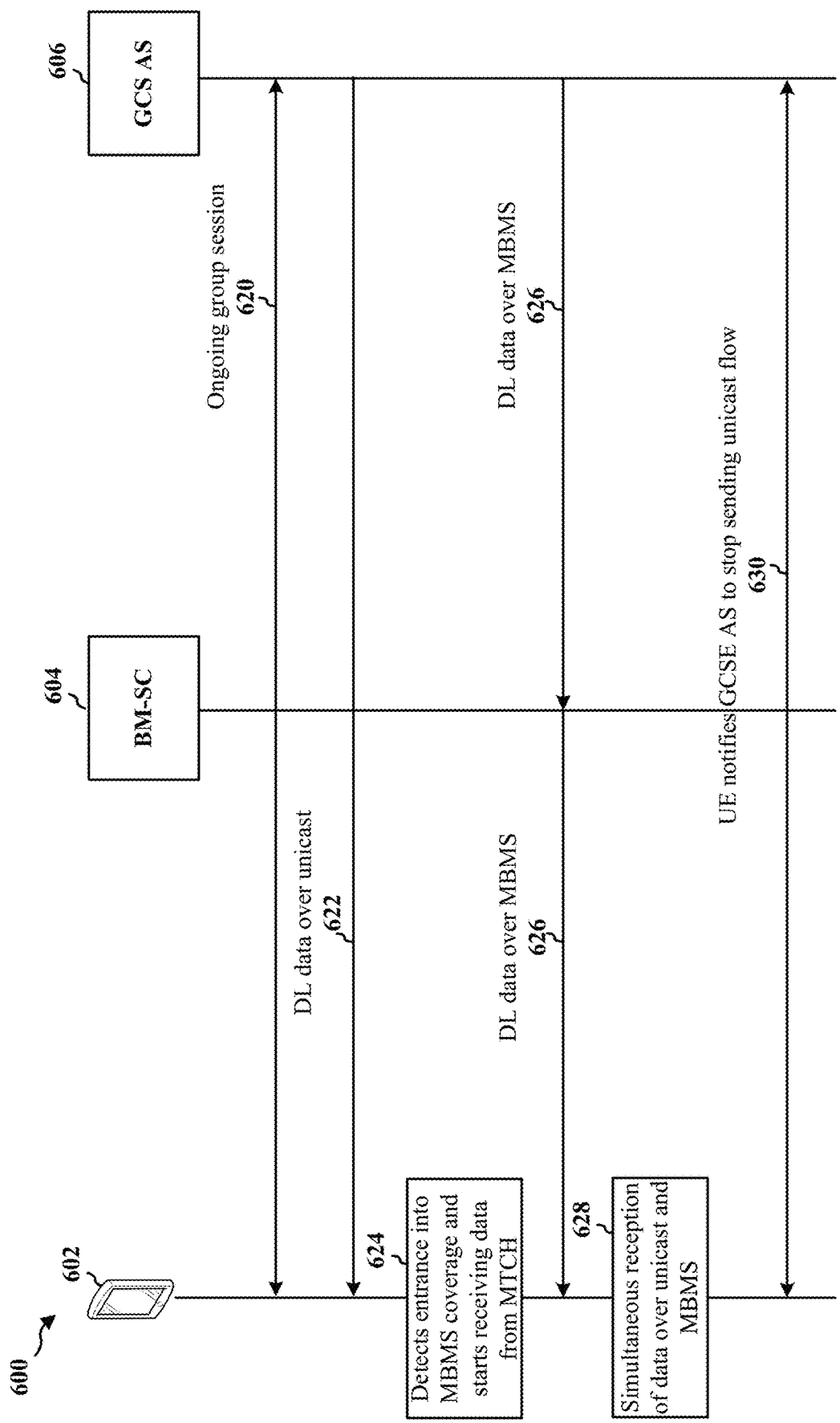
FIG. 6 is a call flow diagram of a method of wireless communication.

FIG. 6 illustrates a call flow diagram for a method 600 of wireless communication. In aspects, the UE 602 may have established a connection to a group call service, e.g., from the GCS AS 606. Thus, the UE 602 and the GCS AS 606 may be engaged in an ongoing group session 620 (e.g., group call service). In connection therewith, the GCS AS 606 may transmit downlink data 622 to the UE 602 over unicast.

While engaged in the ongoing group session 620, the UE 602 may detect that the UE 602 enters into MBMS coverage and may receive data from the MTCH 624. Accordingly, the GCS AS 606 may transmit downlink data 626 over MBMS, which may reach the UE 602 through the BM-SC 604. In some aspects, the UE 602 may contemporaneously/simultaneously receive downlink data 628 over both unicast and MBMS. Therefore, the UE 602 may notify 630 the GCS AS 606 to stop sending information (downlink data) over unicast, however the UE 602 may continue to receive the downlink data 626 over MBMS.

Figure 7:
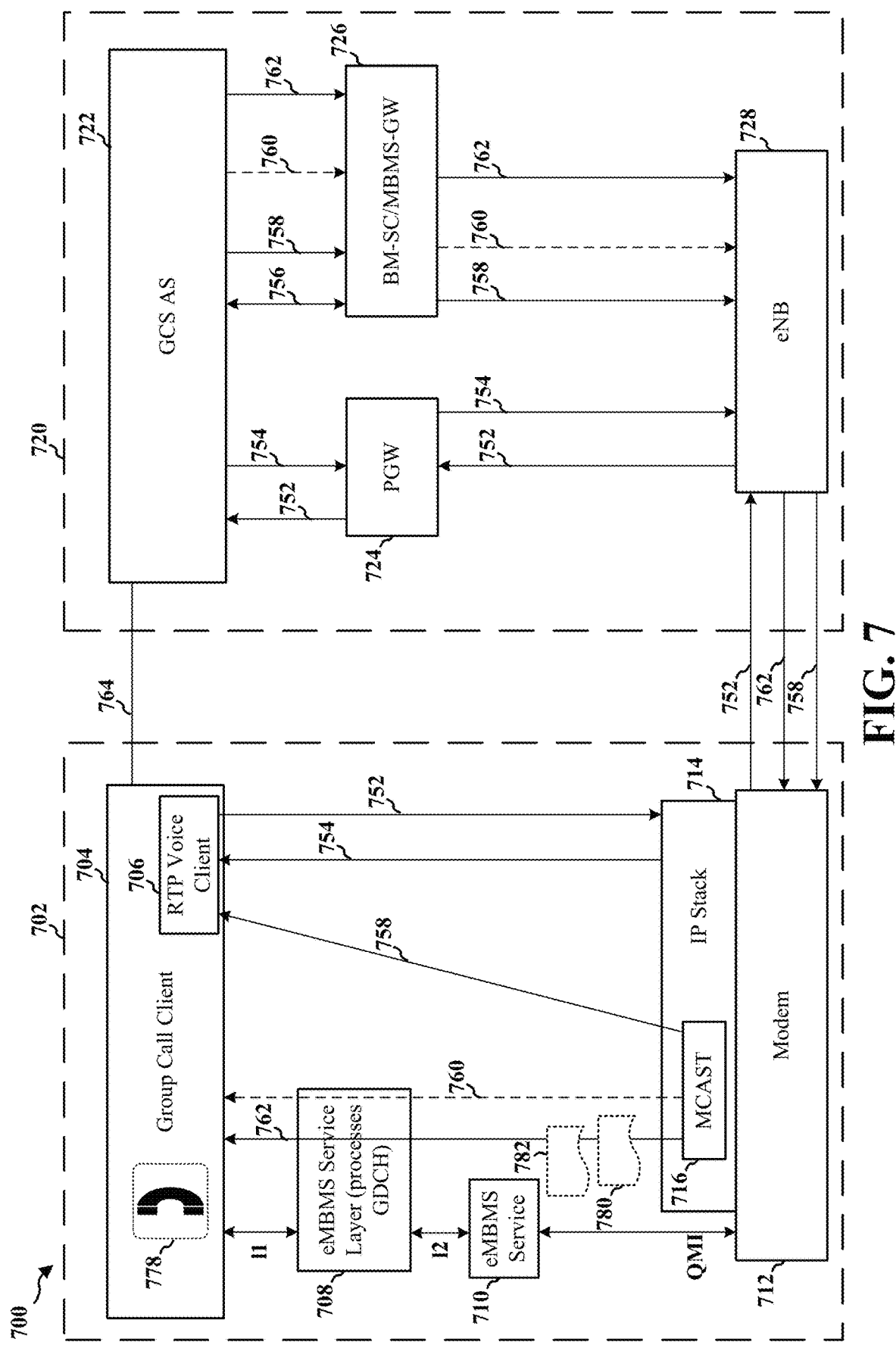
FIG. 7 is a diagram of a wireless communications system.

FIG. 7 illustrates a diagram of a wireless communication system 700. The wireless communication system 700 may include a UE 702 and a network 720. The network 720 may include at least a GCS AS 722, a packet gateway (PGW) 724, a BM-SC 726, and a eNB 728. In an aspect, the GCS AS 722 may communicate with the BM-SC 726 using an MB2-C interface 756.

The UE 702 may include at least a modem 712 (e.g., baseband processor) communicatively coupled with an IP stack 714, which is communicatively coupled with a group call client 704 (e.g., an application) of the UE 702. The IP stack 714 may include a multicast (mcast) layer 716 (e.g., for user datagram protocol (UDP) support). The group call client 704 may include a real-time transport protocol (RTP) voice client 706. The UE 702 may further include an eMBMS service layer 708 and/or an eMBMS service 710.

In one aspect, the GCS AS 722 and the group call client 704 may communicate over a GC1 interface 764, which may be unicast and SIP-based. For communication over unicast between the GCS AS 722 and the group call client 704, the GCS AS 722 may transmit downlink data over unicast 754 through the PGW 724 and the eNB 728, where the downlink data over unicast 754 may reach the RTP voice client 706 of the group call client 704. In the uplink, the RTP voice client 706 may send uplink data over unicast 752 to the GCS AS 722.

When the UE 702 is in an MBMS coverage area, the UE 702 may begin to receive downlink data (e.g., data associated with a group call service) over broadcast. For example, the GCS AS 722 may transmit downlink data over broadcast 758 through the BM-SC 726 (e.g., using the MB2-U interface) and the eNB 728. As such, downlink data sent over broadcast 758 may reach the RTP voice client 706 of the group call client 704 through the mcast layer 716.

In various aspects for a group call service, a TMGI may be announced, and a general purpose MBMS subchannel 760 may be established between the GCS AS 722 and the group call client 704. The general purpose MBMS subchannel 760 may be established through an association between the general purpose MBMS subchannel 760 and the TMGI (e.g., a TMGI associated with a group call service). The general purpose MBMS subchannel 760 may carry a UDP port of the source of a group call service and IP address of the group call service. The general purpose MBMS subchannel 760 may be limited to specific parameters, which may describe limited aspects of a group call service. The parameters of the general purpose MBMS subchannel 760 may be carried in a map group to bearer message (e.g., to inform the UE 702 about the start and/or access of a group call service). The map group to bearer message may include a TMGI, an MBMS subchannel for audio and floor control, and a mission critical push-to-talk (MCPTT) group identifier in the activated MBMS bearer used for the group call service, and so forth.

Figure 8:
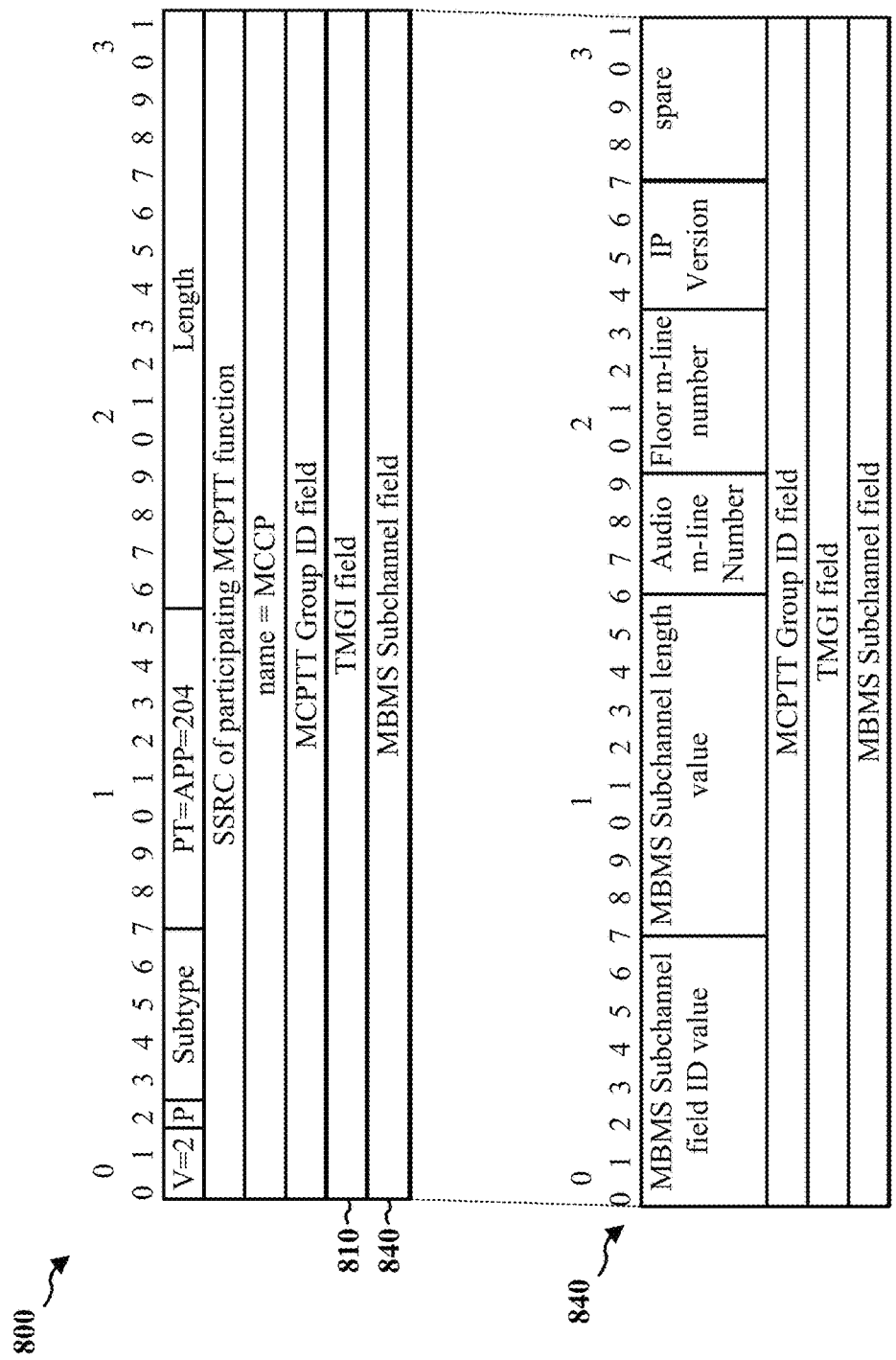
FIG. 8 is a diagram of a wireless communications message.

The map group to bearer message may be described in one or more 3GPP Technical Specifications (TS), such as 3GPP TS 24.380. For example, the map group to bearer message (subtype 00000) may be referred to in subclause 8.4.4 of TS 24.380. The map group to bearer message may be server to client (e.g., a participating MCPTT function may be a server and the MCPTT client may be the client). FIG. 8, infra, illustrates the map group to bearer message 800, which includes the MBMS subchannel field coding 840.

Figure 9:
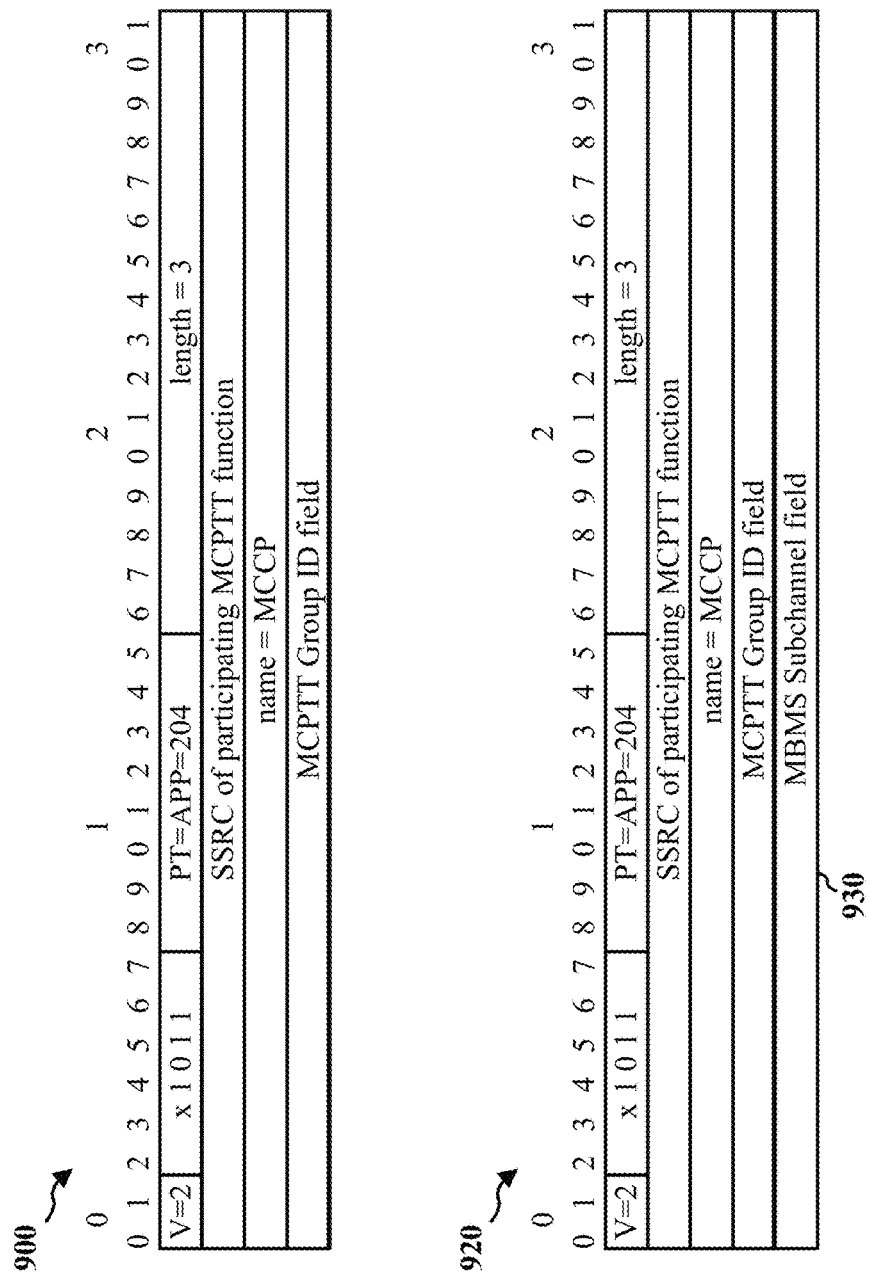
FIG. 9 is a diagram of a wireless communications message.

When the established connection with a group call service is terminated, the UE 702 may receive an unmap group to bearer message. The unmap group to bearer message may be server to client (e.g., a participating MCPTT function may be a server and the MCPTT client may be the client). FIG. 9, infra, illustrates a first aspect of a first unmap group to bearer message 900 and a second aspect of another unmap group to bearer message 920. The map group to bearer and unmap group to bearer may be the messages defined for the general purpose MBMS subchannel 760.

A GDCH 762 may provide a framework for group call services over broadcast. For example, the UE 702 may bootstrap access to the GDCH 762, e.g., without receiving data over unicast. The GDCH 762 may also be known as a Group Call System Enabler (GCSE) discovery channel. In various aspects, the UE 702 may access the GDCH 762 through a TMGI associated with the GDCH 762.

In an aspect, the GCS AS 722 may broadcast the GDCH. Accordingly, the group call client 704 may receive information carried on the broadcasted GDCH 762. In one aspect, the GCS AS 722 may broadcast information associated with group call services similarly to the general purpose MBMS subchannel 760 (e.g., through the BM-SC 726 and the eNB 728 at the network 720, and through the mcast layer 716 to the eMBMS service layer 708). The eMBMS service layer 708 may process downlink data carried on the GDCH 762 and provide downlink data carried on the GDCH 762 to the group call client 704.

The GDCH 762 may operate as an enhancement to the general purpose MBMS subchannel 760 (e.g., the GDCH 762 may replace the general purpose MBMS subchannel 760). Alternatively, the GDCH 762 may act operate as a parallel stream with the general purpose MBMS subchannel 760.

The GDCH 762 may operate carry information in a manner similar to a service discovery channel, which may be defined in 3GPP TS 26.346. For example, files may be broadcast on the GDCH 762 using a file delivery over unidirectional transport (FLUTE) protocol. In an aspect, the GDCH 762 may carry streaming data, files for delivery, and/or other services.

While FIG. 7 illustrates one GDCH 762, the present disclosure comprehends aspects in which the UE 702 receives a plurality of GDCHs 762. For example, multiple GDCHs may be broadcast in a same area (e.g., a coverage area 110), and each GDCH may be associated with a different set of group call services. In another aspect, the GDCH 762 may be described in another GDCH. In such an aspect, the UE 702 may decode information carried on the other GDCH in order to access group call services announced on the GDCH 762.

In an aspect, the UE 702 may receive, from the GCS AS 722, broadcast files using a FLUTE protocol or another protocol. The UE 702 may receive fragments of files carried on the GDCH 762 in versioned parts (e.g., according to an SDP message). In an aspect, the UE 702 may receive fragments carried on the GDCH 762 compressed as a single file, or the UE 702 may receive multiple fragments in multiple files. The UE 702 may receive files according to one or more mechanisms described in 3GPP TS 26.346.

In various aspects, the UE 702 may access group call services using the GDCH 762. For example, the UE 702 may access group call services using the broadcasted GDCH 762 in order to avoid using unicast for group call services. The GDCH 762 may allow the UE 702 to access metadata (e.g., associated with a group call service) at a faster rate than unicast. The UE 702 may switch between unicast and broadcast using data carried on the GDCH 762. Accordingly, the UE 702 may experience lower latency, faster switching (e.g., between broadcast and unicast), increased functionality, and higher reliability (e.g., because GDCH 762 data is broadcast data that may be decodable beyond the range of unicast). Further, the GDCH 762 may reduce load on the network 720, for example, by decreasing the downlink data over unicast 754 to the UE 702. In one aspect, unicast 754 may be absent.

In one aspect, the UE 702 may determine that a TMGI is associated with the GDCH 762. For example, the group call client 704 may determine that the group call client 704 desires to access group call services associated with mission critical (MC) communication (e.g., a police department, a fire department, a medical services agency, and/or another government agency). The UE 702 may determine that a TMGI is associated with the GDCH 762 on which information associated with those group calls services is carried (e.g., the eMBMS service layer 708 may determine a TMGI).

Based on the determined TMGI, the UE 702 may receive and decode information carried on the GDCH 762. For example, the eMBMS service layer 708 may receive and decode information carried on the GDCH 762 and provide information associated with group call services (e.g., a list of group call services) to the group call client 704. In one aspect, the TMGI may belong to a set of TMGIs known to be associated with group call services (e.g., the TMGI may be a preset value stored in the UE 702).

In one aspect, the UE 702 may receive a service discovery channel (SDCH). For example, the eMBMS service layer 708 may receive and decode information carried on the SDCH. The SDCH may carry USD information, which may include the TMGI associated with the GDCH 762, a delivery method, a protocol (e.g., FLUTE, UDP, RTP, etc.) a media type, and the like. Accordingly, the UE 702 may determine that a TMGI is associated with a GDCH 762 based on information carried on the SDCH.

In another aspect, the UE 702 may receive the TMGI from a server (e.g., a domain name system (DNS) server). For example, eMBMS service layer 708 may obtain a uniform resource identifier (URI) (e.g., URL), which may be based on the current PLMN (e.g., a PLMN in which the UE 702 is operating). In an aspect, the URI may include a mobile country code (MCC) and/or a mobile network code (MNC). For example, a URI of mccxxx_mncyyy.operator.com may be used to query a server for an operator with an MCC of xxx and an MNC of yyy. In an aspect, the URI may include an indication or an agency or group call service. For example, a URI of mccxxx_mncyyy.operator.com/GDCH?agency=San_Diego_PD may be used to query a server to obtain a GDCH associated with group call service(s) of the San Diego police department. In such an aspect, the UE 702 may receive the TMGI of the GDCH 762 from the server in response to the URI.

In accessing the GDCH 762, the UE 702 may receive, through the broadcasted GDCH 762, a list of group call services 780. For example, the group call client 704 may receive the list of group call services 780 carried on the broadcasted GDCH 762.

The group call client 704 may determine the at least one group call service 778 to receive. For example, the group call client 704 may select or identify at least one group call service 778 from the list of group call services 780. According to one example, the group call client 704 may select a public safety group call service or agency group call service (e.g., group call service for a police department, group call service for a fire department, etc.). In another example, the group call client 704 may be configured to receive a type of group call service, such as a group call service for a public safety agency, MC service, or other organization (e.g., police, fire department, health/hospital services, etc.).

In order to establish a connection with the group call service 778, the UE 702 may receive information associated with the group call service 778. The UE 702 may receive the information for establishing a connection with the group call service 778 in the SDP information 782 corresponding to the group call service 778 and carried on the GDCH 762. Examples of information related to the group call service include a TMGI associated with the group call service 778, an address associated with the group call service 778, a port associated with the group call service 778, a bearer associated with the group call service 778 (e.g., MBMS bearer), floor control information associated with the at least one group call service 778, one or more user identifiers associated with the group call service 778, a media type (e.g., audio and/or video) associated with the group call service 778, encryption information, and/or other information (e.g., formatting information) associated with the group call service 778.

In an aspect, the eMBMS service layer 708 may provide at least a portion of the SDP information 782 to the group call client 704. The group call client 704 may cause the UE 702 to establish a connection to (e.g., begin to receive) a group call service 778 based at least in part on the SDP information 782 carried on the GDCH 762. For example, the group call client 704 may select, from the list of group call services 780 carried on the GDCH 762, a group call service 778 that the group call client 704 is to join and establish a connection to that group call service based at least in part on the SDP information 782 carried on the GDCH 762.

In one aspect, the GDCH 762 may carry one or more SDP message(s) of the SDP information 782 for each group call service. In an aspect, the SDP information 782 carried on the GDCH 762 may include USD information that provides service availability, service announcement, and/or other service information for the group call service 778. In various aspects, the SDP information 782 carried on the GDCH 762 may be compressed (e.g., "zipped"). In various aspects, the SDP information 782 may include one or more files for the group call service 778. For example, the eMBMS service layer 708 may receive the SDP information 782 carried on the GDCH 762 and decode the SDP information 782 (e.g., in order to obtain one or more service announcement files) associated with the group call service 778.

In various aspects, information for the group call service 778 may be organized across a plurality of files (e.g., fragments of information), which may be separately downloaded by the UE 702 and aggregated by the UE 702 in order to obtain all information necessary for establishing a connection with the group call service 778. In one aspect, a fragment of information may include a security manifest with encryption information (e.g., an indication of how a message should be signed, security for the group call services, etc.). In an aspect, different service announcement files may be associated with different levels of security. In an aspect, a fragment of information may include information defining parameters for services associated with group call services, such as for file repair and/or reception reporting, a service area identifier (SAI) list, a frequency list, consumption reporting, and/or scheduling description.

In an aspect, the UE 702 may establish a connection to the group call service 778 based at least in part on a map group to bearer message. In an aspect, the map group to bearer message may indicate a TMGI of the group call service 778. Accordingly, the UE 702 may activate a bearer of the group call service 778 using the indicated TMGI of the group call service 778. In one aspect, the map group to bearer message may be carried on the GDCH 762. In another aspect, the map group to bearer message may be carried on the general purpose MBMS subchannel 760. An example of a map group to bearer message may be described, infra, with respect to FIG. 8.

Thus, the UE 702 may receive the SDP information 782 carried on the GDCH 762 so that the group call service 778 may be discovered and received through broadcast (e.g., MBMS or eMBMS) instead of through unicast. Accordingly, the UE 702 may avoid accessing group call services based on unicast (e.g., unicast SIP messages).

When the connection to the group call service is to be at least partially terminated, the UE 702 (e.g., the eMBMS service layer 708) may receive an unmap group to bearer message. In one aspect, the unmap group to bearer message may unmap all previous mappings of a group call service from an IP address and port. In another aspect, the unmap group to bearer message may include at least one of a source type or a media type that is to be unmapped when the connection of a specific source to the group call service is ended. For example, the unmap group to bearer message may indicate an m-line number associated with one of audio or video. The unmap group to bearer message may be carried on the general purpose MBMS subchannel 760 or carried on the GDCH 762. An aspect of the unmap group to bearer message may be described, infra, with respect to FIG. 9.

FIG. 8 illustrates an aspect of a map group to bearer message 800. In aspects, the map group to bearer message 800 may include information describing the group call service 778, for example, so that the UE 702 may activate a bearer for the group call service 778 and connect thereto. In an aspect, map group to bearer message may include information indicating a TMGI associated with the group call service 778 in the TMGI field 810. In aspects, the map group to bearer message may include an MBMS subchannel field 840, for example, in order to map a media or source type associated with the bearer of group call service 778.

FIG. 9 illustrates two aspects of unmap group to bearer messages 900, 920. The first unmap group to bearer message 900 may be used to unmap a group from a bearer for a group call service (e.g., the group call service 778). In another aspect, the unmap group to bearer message 920 may be used to unmap a group from a bearer for a group call service. However, the unmap group to bearer message 920 may include an MBMS subchannel field 930, which may provide finer control than the unmap group to bearer message 900. For example, the unmap group to bearer message 920 may target the media or source type that is being unmapped (e.g., as carried in the MBMS subchannel field 930). In an aspect, the MBMS subchannel field 930 may unmap by m-line number (e.g., similar to the MBMS subchannel field 840 of FIG. 8, but for unmapping). By unmapping the media or source type, the group call service as a whole may not be unmapped from the bearer. When the connection to a group call service is ended, the UE 702 may receive the unmap group to bearer message (e.g., from the GCS AS 722).

Figure 10:
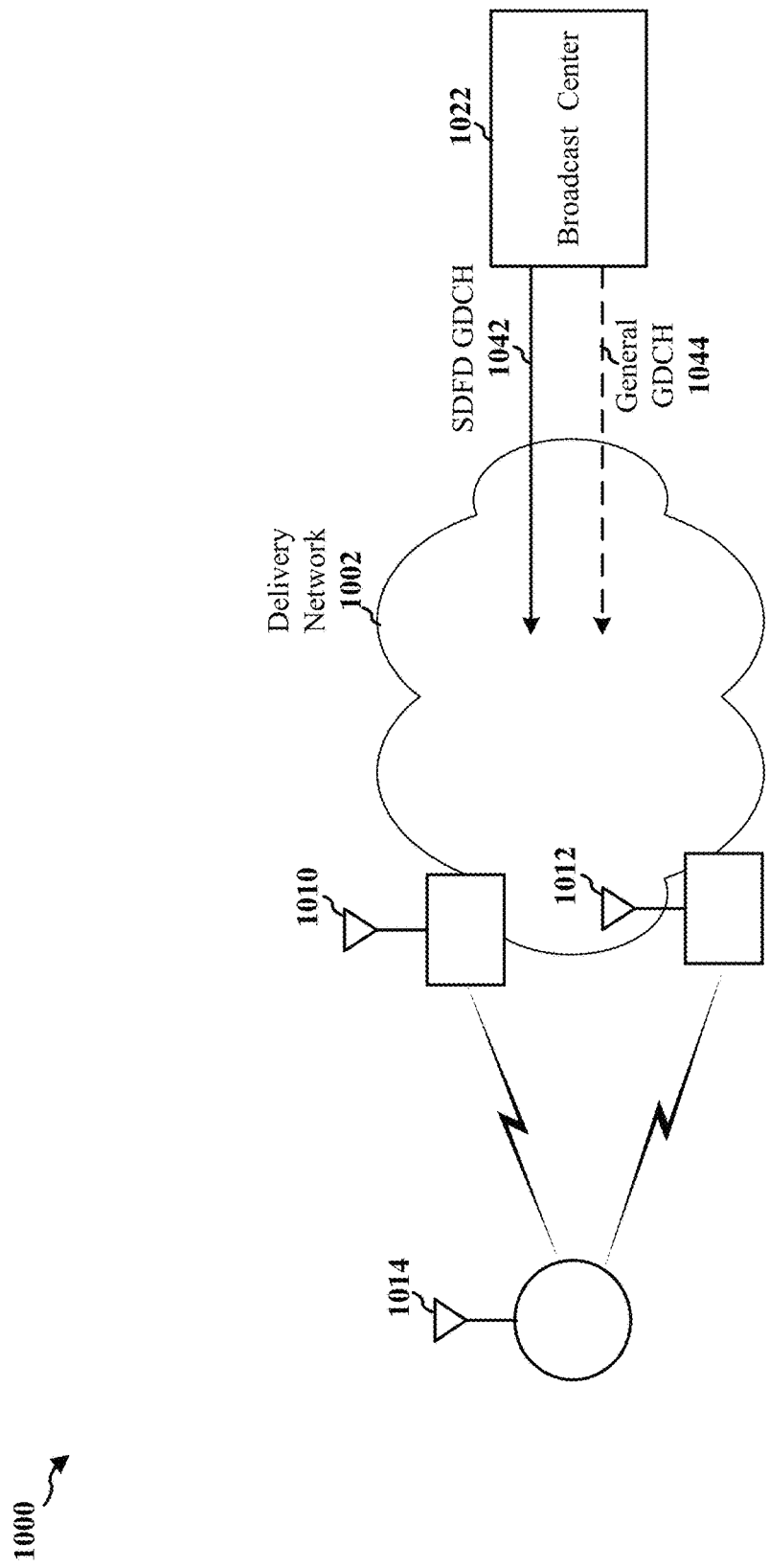
FIG. 10 is a diagram of a wireless communications system.

FIG. 10 illustrates a block diagram of a wireless communications system 1000.

The wireless communications system 1000 may include a UE 1014 and a plurality of eNBs 1010, 1012. The wireless communications system 1000 may further include a broadcast center 1022 configured to broadcast information carried on a plurality of GDCHs 1042, 1044 through a delivery network 1002. The broadcast center 1022 may include, for example, a BM-SC configured to broadcast the GDCHs 1042, 1044 though the delivery network 1002, which may include a WLAN, WWAN, and/or other network.

In an aspect, a general GDCH 1044 may carry information associated with another GDCH, such as the San Diego Fire Department (SDFD) GDCH 1042. In another aspect, an SDCH may carry information associated with the SDFD GDCH 1042. The UE 1014 may determine a TMGI associated with the general GDCH 1044. The UE 1014 may bootstrap access to the general GDCH 1044 based on the TMGI associated with the general GDCH 1044. The UE 1014 may decode the general GDCH 1044, received through a first eNB 1012, in order to determine information associated with the SDFD GDCH 1042, which the UE 1014 may be interested in receiving, for example, in order to receive a set of group call services associated with the SDFD GDCH 1042.

The SDFD GDCH 1042 may carry information associated with group call services for the SDFD, such as a list of group call services and information associated with each group call service. In an aspect, the SDFD GDCH 1042 may carry information specific to an area (e.g., a geographic coverage area). The UE 1014 may determine a group call service that the UE 1014 desires to join and may decode information carried on the SDFD GDCH 1042 that includes information associated with the desired group call service, such as an SDP message and/or parameters for joining the group call service. Based on the information carried on the SDFD GDCH 1042 (e.g., SDP message(s)), the UE 1014 may receive a group call service.

Figure 11:
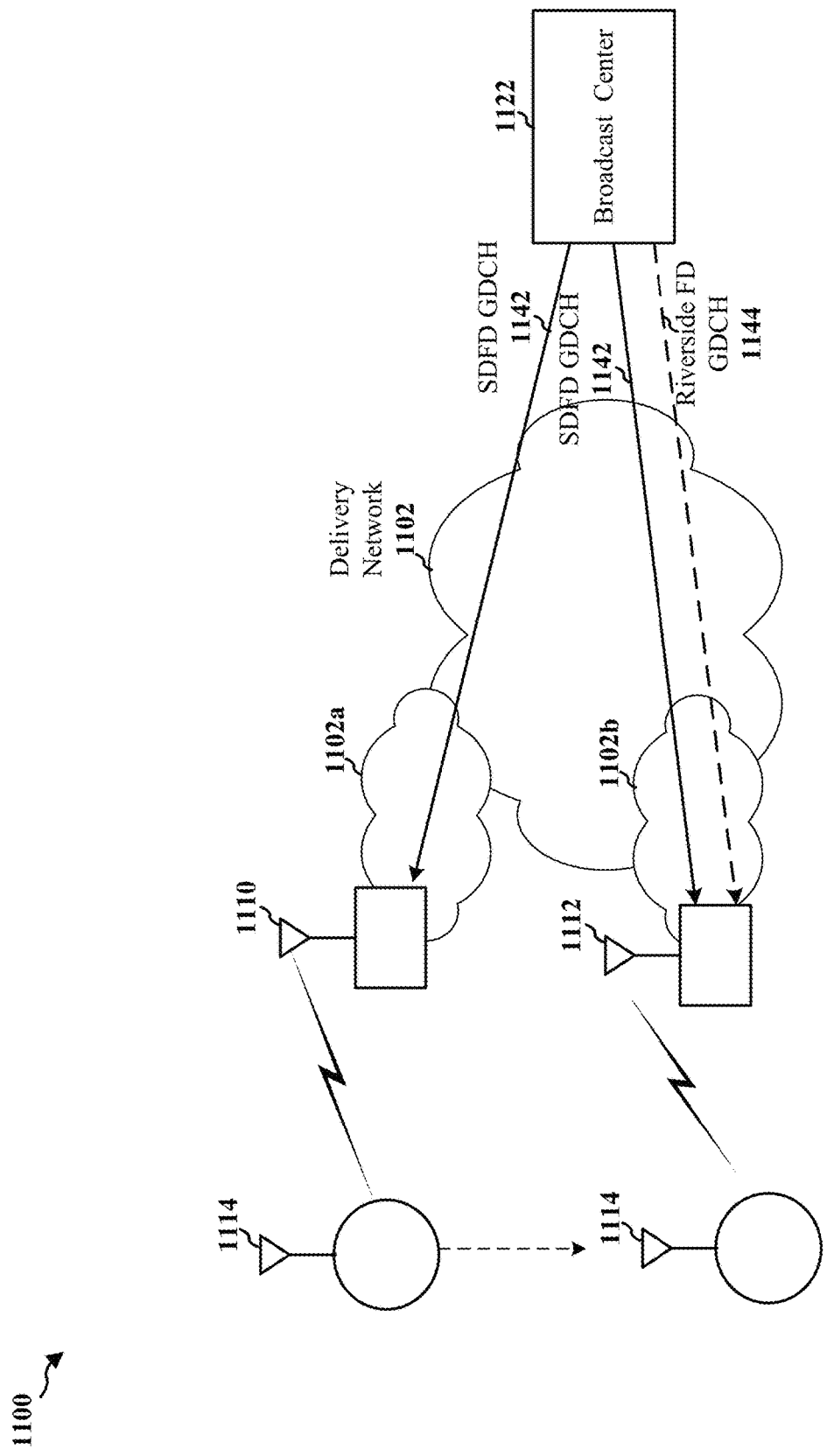
FIG. 11 is a diagram of a wireless communications system.

FIG. 11 illustrates a block diagram of a wireless communication system 1100. The wireless communication system 1100 may include a UE 1114 and a plurality of eNBs 1110, 1112. The wireless communication system 1100 may further include a broadcast center 1122 configured to broadcast a plurality of GDCHs 1142, 1144 through a delivery network 1102. The broadcast center 1122 may include, for example, a BM-SC configured to broadcast the GDCHs 1142, 1144 though the delivery network 1102, which may include a WLAN, WWAN, and/or other network. In an aspect, the delivery network 1102 may include a first network 1102a for a first geographic area (e.g., San Diego) and a second network 1102b for a second geographic area (e.g., Riverside).

In aspects, multiple GDCHs 1142, 1144 may be broadcast. Access to group call services associated with one area or agency may be made accessible through another agency or area by linking the GDCHs 1142, 1144. For example, the SDFD GDCH 1142 may include information (e.g., access and scheduling information) that indicates how to access the Riverside FD GDCH 1144. For example, the SDFD GDCH 1142 may carry information indicating a TMGI for the Riverside FD GDCH 1144.

In an aspect, the UE 1114 may receive information carried on the SDFD GDCH 1142 through the first eNB 1110 and bootstrap access to the SDFD GDCH 1142, for example, when the UE 1114 is in a coverage area of the first network 1102a. In an aspect, the broadcast center 1122 may include, on the SDFD GDCH 1142, bootstrap information (e.g., information indicating a TMGI) for access to the Riverside FD GDCH 1144. Therefore, the UE 1114 may receive and decode information for accessing the Riverside FD GDCH 1144 that is carried on the SDFD GDCH 1142. When the UE 1114 moves to the second network 1102b, the UE 1114 may receive and decode the Riverside FD GDCH 1144 based on the information carried on the SDFD GDCH 1142. Thus, the UE 1114 may bootstrap access to the Riverside FD GDCH 1144 when in the second network 1102b to receive group call services in the second coverage area, e.g., based on information carried on the SDFD GDCH 1142.

In another aspect, the UE 1114 may continue to receive the SDFD GDCH 1142 when in the coverage area of the second network 1102b. The broadcast center 1122 may broadcast the SDFD GDCH 1142 with information for accessing the group call services of the Riverside FD GDCH 1144. That is, in the coverage area of the second network 1102b, the SDFD GDCH 1142 may carry information similar to that carried on the Riverside FD GDCH 1144, such as information indicating how to access group call services of the Riverside FD (e.g., one or more service announcement files, an SDP message, etc.).

Figure 12:
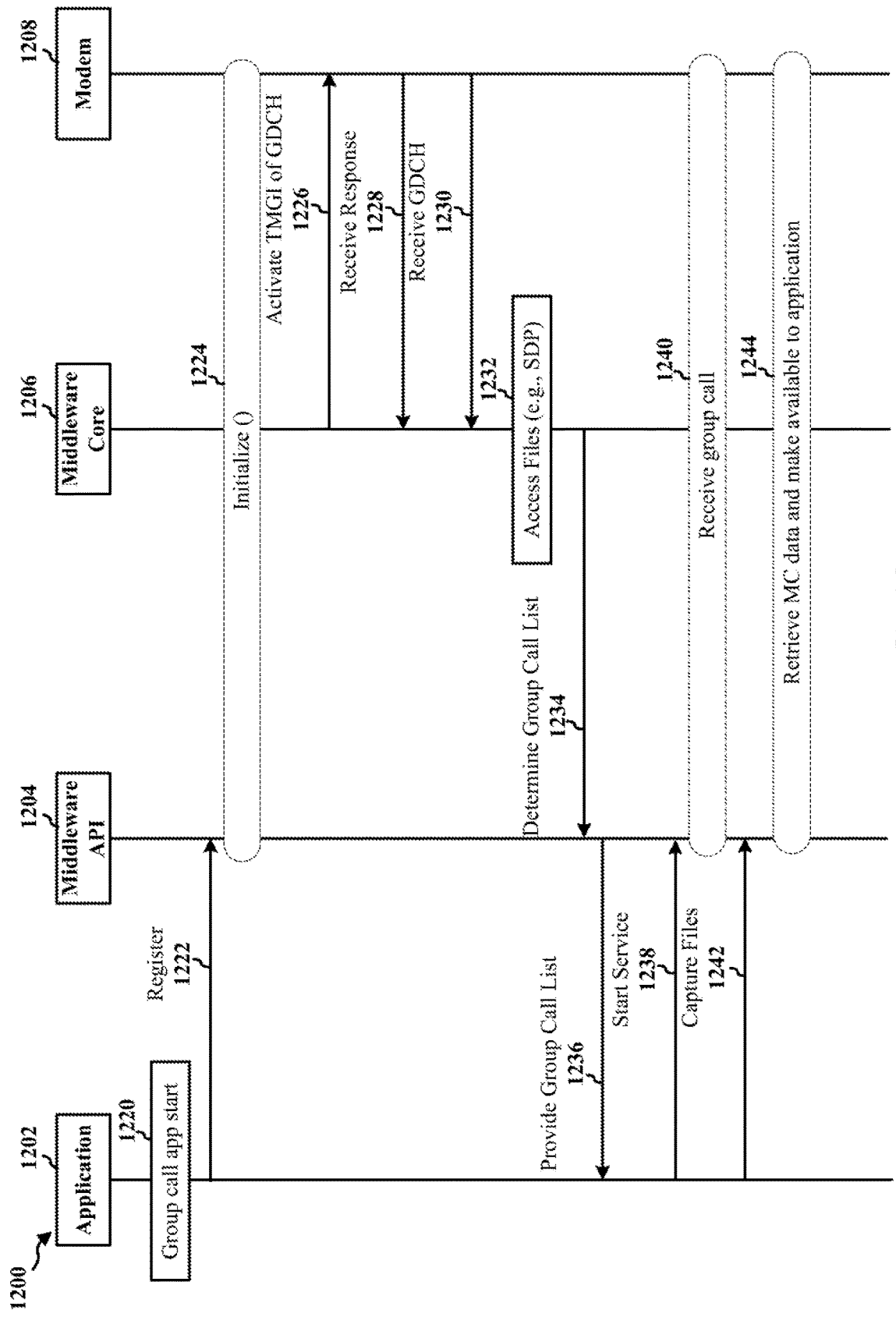
FIG. 12 is a call flow diagram of a method of wireless communication.

FIG. 12 is a call flow diagram of a method 1200 of wireless communication. The method 1200 may be performed by a UE, such as the UE 702 or the apparatus 1402/1402'. In aspect, the application 1202 may include the group call client 704. In an aspect, the middleware application program interface (API) 1204 and the middleware core 1206 may be included in or may be communicatively coupled with the eMBMS service layer 708. In an aspect, the modem 1208 may be the modem 712.

In an aspect, the application 1202 may be launched or started 1220. The application 1202 may register 1222 using the middleware API 1204 in order to indicate that the application 1202 is to determine at least one group call service from a list of group call services and corresponding SDP information that may be broadcast on a GDCH.

Through the middleware API 1204, the middleware core 1206 may initialize 1224 in order to receive the GDCH from the modem 1208. The middleware core 1206 may determine a TMGI associated with a GDCH that carries group call services that are desired by the application 1202. The middleware core 1206 may activate 1226 the TMGI associated with the GDCH. Through the modem 1208, the middleware core 1206 may receive 1228 a response (e.g., a registration response or other indication that the TMGI is successfully activated at the network).

Through the modem 1208, the middleware core 1206 may receive 1230 the broadcasted GDCH. The middleware core 1206 may decode information carried on the GDCH and access 1232 one or more files, such as one or more SDP messages. Based on the one or more files recovered by the middleware core 1206, the middleware core 1206 may determine 1234 a list of available group call services. Through the middleware API 1204, the group call service list may be provided 1236 to the application 1202.

The application 1202 may determine a group call service that the application 1202 desires to join. The application 1202 may start 1238 the service in order to receive the determined group call service. Through the modem 1208, the middleware core 1206 may receive 1240 data for the determined group call service (e.g., MC voice, MC video, etc.). The application 1202 may begin to capture 1242 the files associated with the selected group call service, for example, in order to provide a group call service through the application 1202 (e.g., output audio and/or video). As the middleware core 1206 retrieves 1244 MC data (e.g., MC voice, MC video, etc.), which may be broadcast over a FLUTE session, the middleware core 1206 may expose that data to the application 1202 through the middleware API 1204. Accordingly, a group call service may be determined and a connection to the group call service may be established thereto via a broadcasted GDCH.

Figure 13A:
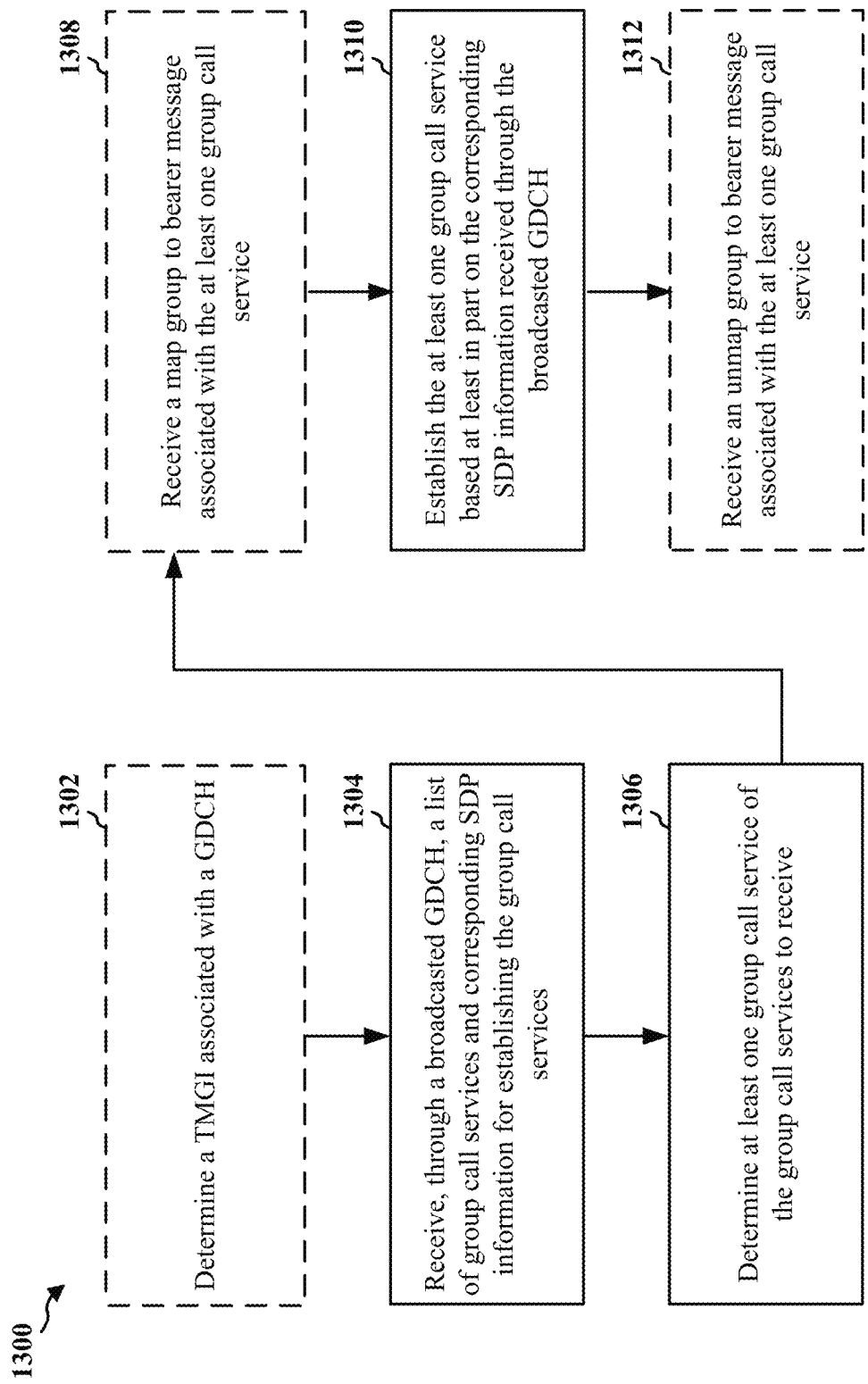
FIG. 13A is a flowchart of a method of wireless communication.

FIG. 13A is a flowchart of a method 1300 of wireless communication. The method may be performed by a UE (e.g., the UE 702, the apparatus 1402/1402'). Optional operations may be illustrated with dashed lines. According to various aspects, one or more operations may be transposed, omitted, added, and/or contemporaneously performed.

At 1302, the UE may determine a TMGI is associated with a GDCH. In one aspect, the TMGI may belong to a set of TMGIs known to be associated with the group call services. In an aspect, the UE may determine a set of group call services that are to be accessed by the UE, and the UE access stored information indicating the TMGI for a GDCH associated with the set of group call services. In the context of FIG. 7, the UE 702 may determine a TMGI is associated with a GDCH 762. In the context of FIG. 12, the middleware core 1206 may determine a TMGI is associated with a GDCH.

At operation 1304, the UE may receive, through a broadcasted GDCH, a list of group call services and corresponding SDP information for establishing the group call services. For example, the UE may activate the TMGI for receiving the GDCH, and the UE may receive information carried on the GDCH. In an aspect, the SDP information may include a respective TMGI associated with each group call service of the list of group call services. In an aspect, the SDP information indicates at least one of an address associated with the at least one group call service, a port associated with the at least one group call service, a MBMS bearer of the at least one group call service, floor control information of the at least one group call service, or one or more user identifiers of the at least one group call service. In an aspect, the SDP information may include a file associated with service announcement for the at least one group call service. The file may be compressed. In various aspects, The UE may receive the GDCH through broadcast. In the context of FIG. 7, the UE 702 may receive the GDCH 762. In the context of FIG. 12, the middleware core 1206 may receive 1230 the SDP information carried on the GDCH.

At operation 1306, the UE may determine at least one group call service of the group call services to receive. For example, the UE may determine a type of group call service that is of interest (e.g., a group call service associated with an agency or other organization, such as a group call service for public safety, a group call service associated with a fire department or police department, and so forth). The UE may then select the group call service that is of interest. In an aspect, the UE may select the group call service of interest and may identify SDP information corresponding to that selected group call service. In the context of FIG. 7, the UE 702 may determine at least one group call service 778 to receive from the list of group call services 780 carried on the GDCH 762. In the context of FIG. 12, the middleware core 1206 may access 1232 one or more files related to at least one group call service.

At operation 1308, the UE may receive a map group to bearer message associated with the at least one group call service. In an aspect, the map group to bearer message may be carried on a general purpose MBMS subchannel associated with the at least one group call service or may be carried on the GDCH. In an aspect, the map group to bearer message may indicate information associated with the at least one group call service that is to be received. For example, the map group to bearer message may indicate a TMGI of the at least one group call service, a group ID of the at least one group call service, a synchronization source (SSRC) associated with the at least one group call service, and/or other information associated with the at least one group call service. In the context of FIG. 7, the UE 702 may receive a map group to bearer message, for example, carried on the general purpose MBMS subchannel 760 or the GDCH 762. An aspect of the map group to bearer message may be illustrated as the map group to bearer message 820 of FIG. 8.

At operation 1310, the UE may establish the at least one group call service based at least in part on the corresponding SDP information received through the broadcasted GDCH. In an aspect, the UE may establish the at least one group call service by receiving the at least one group call service, for example, over broadcast (e.g., MBMS). For example, the UE may select one or more service announcement files associated with the SDP information corresponding to the at least one group call service, and the UE may receive the at least one group call service based on the selected one or more service announcement files. In an aspect, the UE may establish the at least one group call service based at least in part on the map group to bearer message. In an aspect, the UE may activate a bearer for the at least one group call service based on the TMGI of the at least one group call service. In an aspect, the UE may determine at least one SDP message from one or more service announcement files for the at least one group call service. In the context of FIG. 7, the UE 702 (e.g., the eMBMS service layer 708) may determine at least one SDP message of the SDP information 782, carried on the received GDCH 762, that includes information corresponding to the at least one group call service 778. In the context of FIG. 12, the middleware core 1206 may access 1232 one or more SDP messages carried on the GDCH for the at least one group call service. Further, the middleware core 1206 may receive 1240 a group call service, which may be started 1238 by the application 1202.

When the group call service ends and/or when the UE determines to terminate at least a portion of the connection to the at least one group call service, the method 1300 may proceed operation 1312. At operation 1312, the UE may receive an unmap group to bearer message. In an aspect, the unmap group to bearer message may be carried on a general purpose MBMS subchannel that is associated with the at least one group call service. In an aspect, the unmap group to bearer message may be received on a GDCH. In an aspect, the unmap group to bearer message may indicate at least one of a media type or a source type to be unmapped when a source of the connection to the group call service is ended. For example, the unmap group to bearer message may indicate an m-line number associated with one of audio or video. Based on the unmap group to bearer message, the UE may unmap at least a portion of the connection to the at least one group call service. For example, the UE may unmap a port (e.g., audio or video port) associated with the at least one group call service. In the context of FIG. 7, the UE 702 may receive an unmap group to bearer message, which may be carried on the GDCH 762 or the general purpose MBMS subchannel 760. FIG. 9 illustrates aspects of an unmap group to bearer message 900, 920.

Figure 13B:
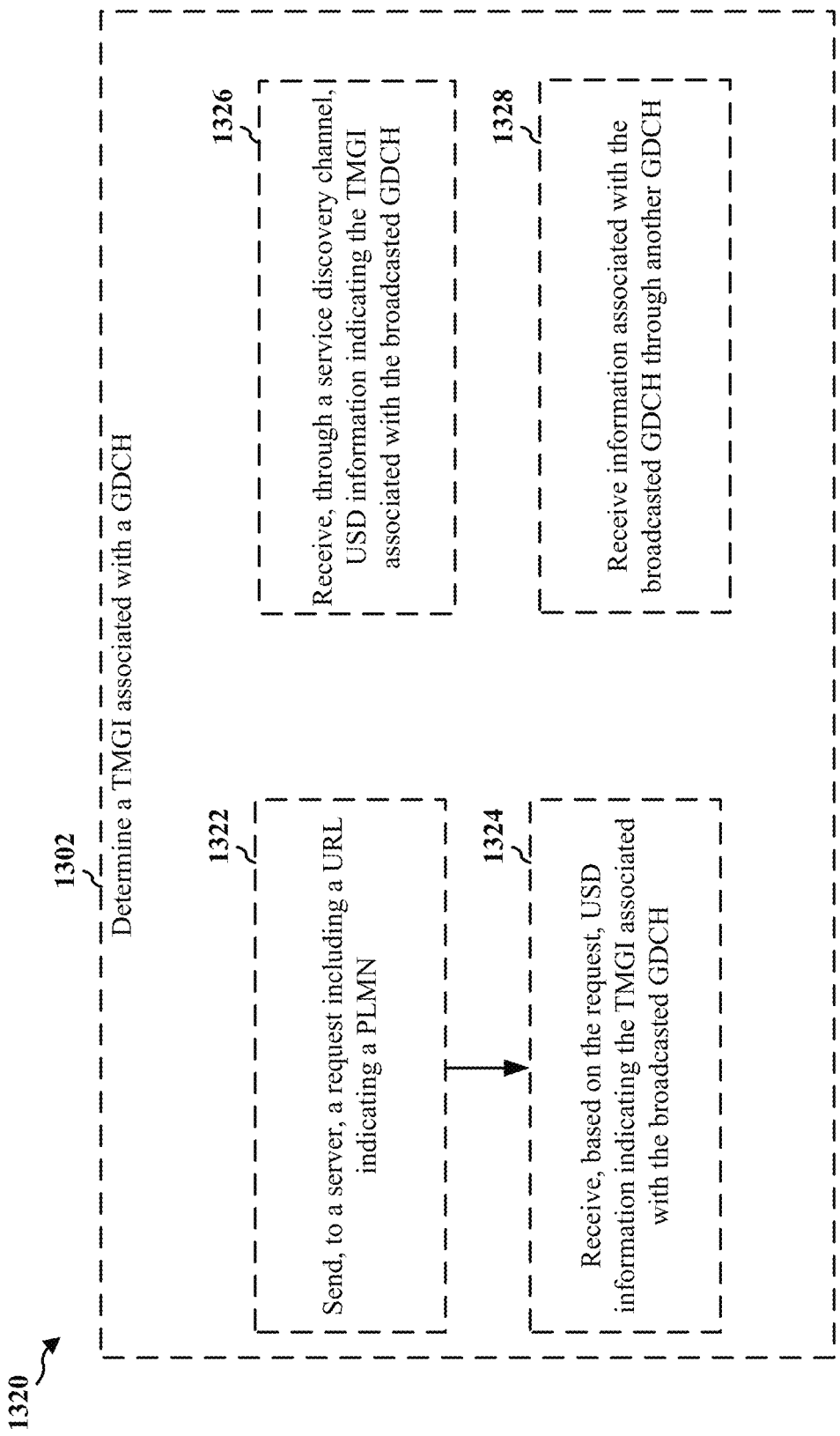
FIG. 13B is a flowchart of a method of wireless communication.

FIG. 13B is a flowchart of a method 1320 of wireless communication. The method 1320 may illustrate various aspects of operation 1302, at which a UE may determine a TMGI associated with a GDCH. Optional operations may be illustrated with dashed lines. According to various aspects, one or more operations may be transposed, omitted, added, and/or contemporaneously performed.

In one aspect of operation 1302, a UE may perform operation 1322 and operation 1324. At operation 1322, the UE may send to a server (e.g., a DNS server) a request for USD information in order to receive a TMGI associated with a GDCH. For example, the UE may construct a URI or URL that indicates at least a current PLMN (e.g., a PLMN in which the UE is operating). In an aspect, the request may indicate an MCC and/or MNC. The UE may send the constructed URI/URL to the server. In the context of FIG. 7, the UE 702 may send, to the GCS AS 722, a request for USD information associated with a broadcasted GDCH.

At operation 1324, the UE may receive, based on the request, USD information indicating the TMGI associated with the broadcasted GDCH. For example, the UE may receive, from the server, USD information, and the UE may identify the TMGI of the broadcasted GDCH indicated in the USD information. In the context of FIG. 7, the UE 702 may receive, from the GCS AS 722, USD information indicating a TMGI of the GDCH 762 in order for the UE 702 to receive the list of group call services 780 and corresponding SDP information 782 carried on the GDCH 762.

In one aspect of operation 1302, a UE may perform operation 1326. At operation 1326, the UE may receive USD information carried on an SDCH. For example, the UE may receive USD information carried on an SDCH, and the UE may identify a TMGI of a GDCH based on the received USD information. In the context of FIG. 7, the UE 702 may receive USD information carried on the SDCH that indicates a TMGI associated with the GDCH 762.

In one aspect of operation 1302, a UE may perform operation 1328. At operation 1328, the UE may receive information associated with the broadcasted GDCH through another GDCH. For example, the other GDCH may carry information (e.g., USD information) indicating information for the broadcasted GDCH. In the context of FIG. 7, the UE 702 may receive information associated with the broadcasted GDCH 762 through another GDCH. For example, FIG. 11 illustrates the SDFD GDCH 1142 may include information (e.g., access and scheduling information) that indicates information to access the Riverside FD GDCH 1144.

Figure 14:
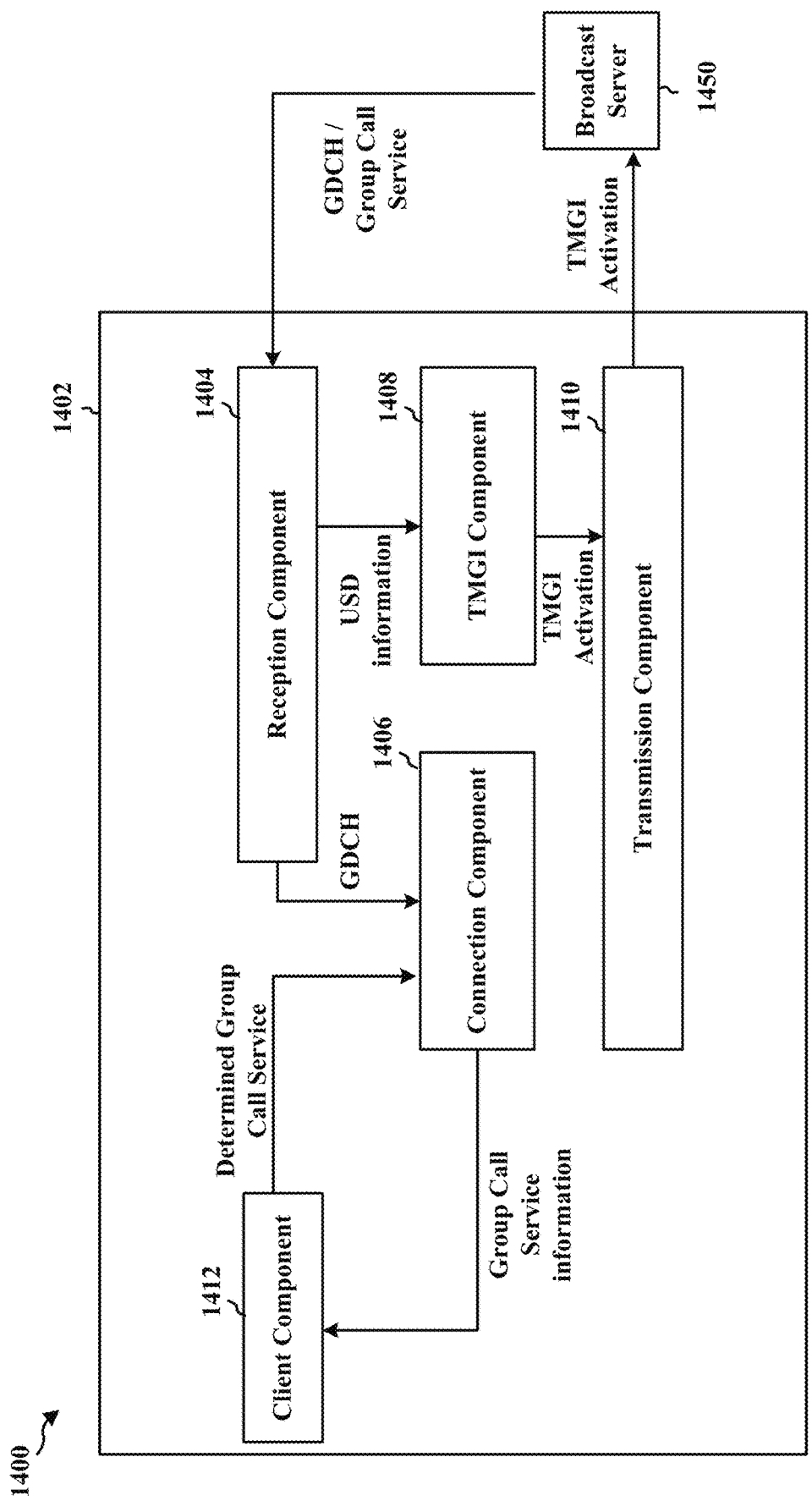
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a UE. The apparatus 1402 includes a reception component configured to receive data from a broadcast server 1450. The apparatus 1402 includes a transmission component 1410 configured to transmit data to a broadcast server 1450.

In an aspect, the apparatus 1402 includes a TMGI component 1408. The TMGI component 1408 may be configured to determine a TMGI associated with a GDCH. In an aspect, the TMGI component 1408 may determine that a TMGI belongs to a set of TMGIs known to be associated with the group call services (e.g., the TMGI may be a stored value). In another aspect, the TMGI component 1408 may be configured to receive a USD carried on an SDCH that includes information indicating that the TMGI is associated with a GDCH. In an aspect, the TMGI component 1408 may be configured to transmit, to a server, a request for a USD (e.g., a request indicating a current PLMN of the apparatus 1402). Based on the request, the TMGI component 1408 may receive a USD that includes information indicating that the TMGI is associated with the GDCH. In another aspect, the TMGI component 1408 may receive information associated with the GDCH through another GDCH, and the TMGI component 1408 may access the GDCH based on the information received through the other GDCH.

In an aspect, the TMGI component 1408 may cause activation of the determined TMGI in order to receive a broadcasted GDCH. The connection component 1406 may receive and decode information carried on the GDCH based on the activated TMGI. In an aspect, the connection component 1406 may receive information carried on the GDCH, including a list of group call services and associated SDP information for establishing group call services. In one aspect, the GDCH may carry information for accessing group call services, such as a list of available group call services and corresponding SDP information for establishing group call services. In one aspect, the connection component 1406 may receive and decode information carried on the GDCH, such as SDP information (e.g., service announcement files). The connection component 1406 may provide information (e.g., a list of group call services, service announcement files, etc.) to the client component 1412.

In an aspect, the client component 1412 may determine (e.g., select or identify) a group call service and provide an indication thereof to the connection component 1406. Accordingly, the connection component 1406 may establish a connection to a group call service. The connection component 1406 may establish the connection to the group call service based on service announcement file(s) and/or SDP information carried on the GDCH that corresponds to the determined group call service. Examples of SDP information include at least one of a TMGI associated with the determined group call service, an address associated with the determined group call service, a port associated with the determined group call service, an MBMS bearer associated with the determined group call service, floor control information associated with the determined group call service, one or more user identifiers associated with the determined group call service, security information associated with the determined group call service, and so forth.

In an aspect, the connection component 1406 may receive a map group to bearer message associated with the determined group call service. For example, the map group to bearer message may include information indicating a TMGI associated with the determined group call service. The connection component 1406 may establish the connection for the determined group call service based on the TMGI associated with the determined group call service. In one aspect, the map group to bearer message may be carried on the GDCH. In another aspect, the map group to bearer message may be carried on a general purpose MBMS subchannel, which may be associated with the determined group call service.

The connection component 1406 may provide information associated with the determined group call service to the client component 1412. For example, the connection component 1406 may provide audio or video associated with the group call service to the client component 1412. The client component 1412 may then cause output (e.g., audio and/or video presentation) associated with the group call service.

In an aspect, when the client component 1412 terminates at least a portion of the established connection to the group call service, the connection component 1406 may receive an unmap group to bearer message. In one aspect, the unmap group to bearer message may include an MBMS subchannel field, which may indicate at least one of a media type or a source type to be unmapped. In response, the connection component 1406 may unmap the indicated at least one of the media type or the source type indicated in the MBMS subchannel field.

In an aspect, one or more of the illustrated components may be part of a middleware core. For example, the TMGI component 1408 and the connection component 1406 may be included in a middleware core (e.g., the middleware core 1206).

The apparatus may include additional components that perform each of the blocks of the algorithm in the aforementioned flowcharts of FIGS. 6, 12, 13A, and 13B. As such, each block in the aforementioned flowcharts of FIGS. 6, 12, 13A, and 13B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
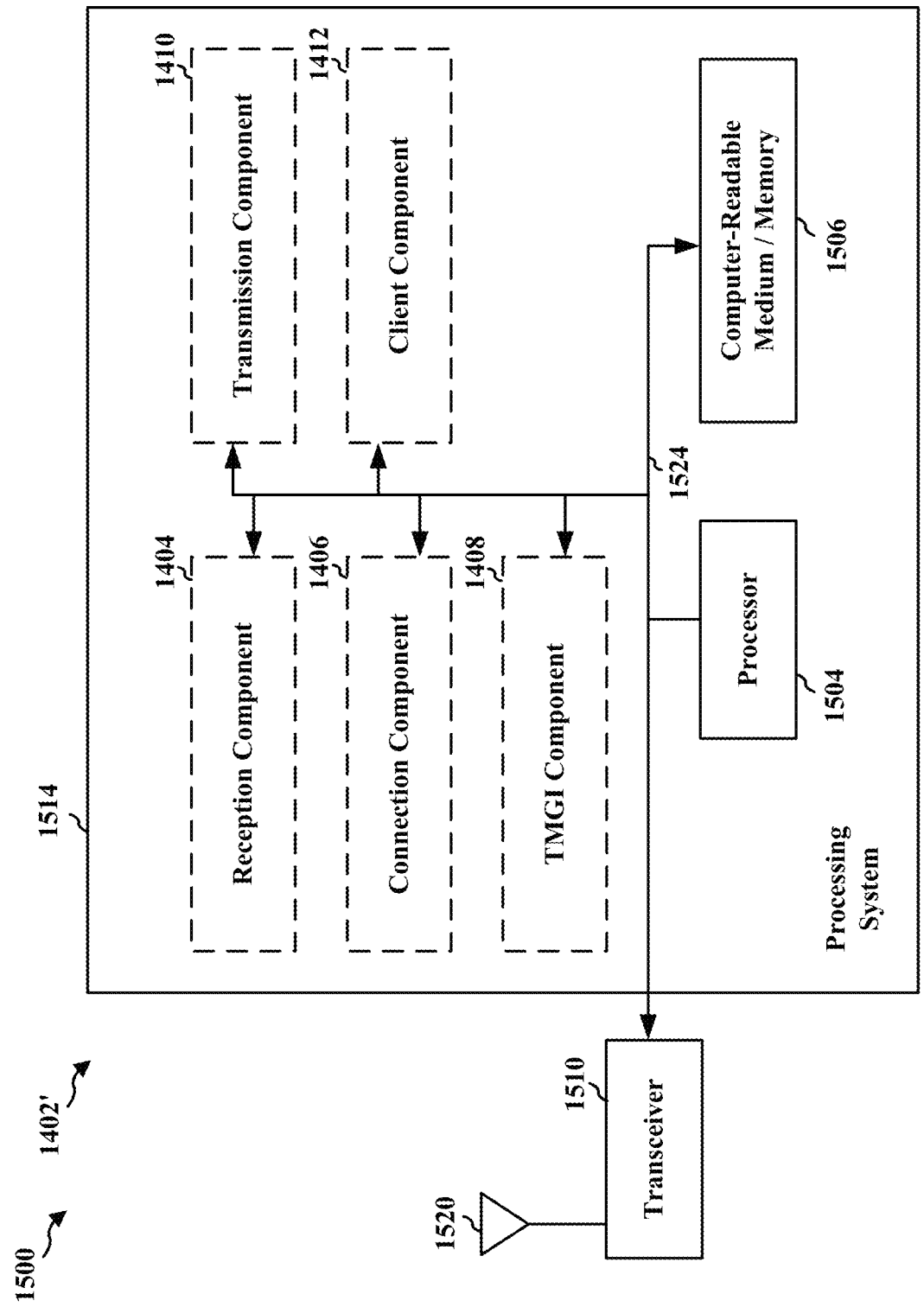
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1410, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412. The components may be software components running in the processor 1504, resident/stored in the computer readable medium/memory 1506, one or more hardware components coupled to the processor 1504, or some combination thereof. The processing system 1514 may be a component of the UE 350 and may include the memory 360 and/or at least one of the TX processor 368, the RX processor 356, and the controller/processor 359.

In one configuration, the apparatus 1402/1402' for wireless communication includes means for receiving, through a broadcasted GDCH, a list of group call services and corresponding SDP information for establishing the group call services. The apparatus 1402/1402' may include means for determining at least one group call service of the group call services to receive. The apparatus 1402/1402' may include means for establishing the at least one group call service based at least in part on the corresponding SDP information received through the broadcasted GDCH. In an aspect, the means for receiving, through the broadcasted GDCH, the list of the group call services and corresponding SDP information for establishing the group call services is configured to receive, through the broadcasted GDCH, the list of group call services and corresponding SDP information based on a TMGI associated with the broadcasted GDCH. In an aspect, the means for sending, to a server, a request including a URL indicating a public land mobile network (PLMN). In an aspect, the means for receiving, based on the request, USD information indicating the TMGI associated with the broadcasted GDCH. In an aspect, the apparatus 1402/1402' may include means for receiving, through a service discovery channel, USD information indicating the TMGI associated with the broadcasted GDCH. In an aspect, the SDP information comprises a file associated with a service announcement for the at least one group call service. In an aspect, the SDP information indicates at least one of an address associated with the at least one group call service, a port associated with the at least one group call service, a MBMS bearer of the at least one group call service, floor control information of the at least one group call service, or one or more user identifiers of the at least one group call service. In an aspect, the apparatus 1402/1402' may include means for receiving a map group to bearer message associated with the at least one group call service, wherein the means for establishing the at least one group call service is configured to establish the at least one group call service based at least in part on the received map group to bearer message. In an aspect, the apparatus 1402/1402' may include means for receiving an unmap group to bearer message associated with the at least one group call service, wherein termination of the at least one group call service is based at least in part on the received unmap group to bearer message. In an aspect, at least one of the map group to bearer message or the unmap group to bearer message is received through a general purpose MBMS subchannel of the at least one group call service. In an aspect, the unmap group to bearer message indicates at least one of a source type or a media type of the at least one group call service that is to be unmapped. In an aspect, the map group to bearer message indicates a TMGI of the at least one group call service. In an aspect, the apparatus 1402/1402' may include means for receiving information associated with the broadcasted GDCH through another GDCH, wherein the means for receiving, through the broadcasted GDCH, the list of the group call services and corresponding SDP information for establishing the group call services is configured to receive, through the broadcasted GDCH, the list of group call services and corresponding SDP information based on the information associated with the broadcasted GDCH received through the other GDCH.

The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), the method comprising:
   receiving, through a broadcasted group discovery channel (GDCH), a list of group call services and corresponding session description protocol (SDP) information for establishing the group call services;
   determining at least one group call service of the group call services to receive; and establishing the at least one group call service based at least in part on the corresponding SDP information received through the broadcasted GDCH.

2. The method of claim 1, wherein the receiving, through the broadcasted GDCH, the list of the group call services and corresponding SDP information for establishing the group call services is based on a TMGI associated with the broadcasted GDCH.

3. The method of claim 2, further comprising:
sending, to a server, a request including a uniform resource locator (URL) indicating a public land mobile network (PLMN); and
receiving, based on the request, user service description (USD) information indicating the TMGI associated with the broadcasted GDCH.

4. The method of claim 2, further comprising:
receiving, through a service discovery channel, user service description (USD) information indicating the TMGI associated with the broadcasted GDCH.

5. The method of claim 1, wherein the SDP information comprises a file associated with a service announcement for the at least one group call service.

6. The method of claim 1, wherein the SDP information indicates at least one of an address associated with the at least one group call service, a port associated with the at least one group call service, a multimedia broadcast multicast service (MBMS) bearer of the at least one group call service, floor control information of the at least one group call service, or one or more user identifiers of the at least one group call service.

7. The method of claim 1, further comprising:
receiving a map group to bearer message associated with the at least one group call service, wherein the establishing the at least one group call service is based at least in part on the received map group to bearer message; and
receiving an unmap group to bearer message associated with the at least one group call service, wherein termination of the at least one group call service is based at least in part on the received unmap group to bearer message.

8. The method of claim 7, wherein at least one of the map group to bearer message or the unmap group to bearer message is received through a general purpose multimedia broadcast multicast service (MBMS) subchannel of the at least one group call service.

9. The method of claim 7, wherein the unmap group to bearer message indicates at least one of a source type or a media type of the at least one group call service that is to be unmapped.

10. The method of claim 7, wherein the map group to bearer message indicates a temporary mobile group identifier (TMGI) of the at least one group call service.

11. The method of claim 1, further comprising:
receiving information associated with the broadcasted GDCH through another GDCH,
wherein the receiving, through the broadcasted GDCH, the list of the group call services and corresponding SDP information for establishing the group call services is based on the information associated with the broadcasted GDCH received through the other GDCH.

12. A user equipment (UE) comprising:
means for receiving, through a broadcasted group discovery channel (GDCH), a list of group call services and corresponding session description protocol (SDP) information for establishing the group call services;
means for determining at least one group call service of the group call services to receive; and
means for establishing the at least one group call service based at least in part on the corresponding SDP information received through the broadcasted GDCH.

13. The UE of claim 12, wherein the means for receiving, through the broadcasted GDCH, the list of the group call services and corresponding SDP information for establishing the group call services is configured to receive, through the broadcasted GDCH, the list of group call services and corresponding SDP information based on a TMGI associated with the broadcasted GDCH.

14. The UE of claim 13, further comprising:
means for sending, to a server, a request including a uniform resource locator (URL) indicating a public land mobile network (PLMN); and
means for receiving, based on the request, user service description (USD) information indicating the TMGI associated with the broadcasted GDCH.

15. The UE of claim 13, further comprising:
means for receiving, through a service discovery channel, user service description (USD) information indicating the TMGI associated with the broadcasted GDCH.

16. The UE of claim 12, wherein the SDP information comprises a file associated with a service announcement for the at least one group call service.

17. The UE of claim 12, wherein the SDP information indicates at least one of an address associated with the at least one group call service, a port associated with the at least one group call service, a multimedia broadcast multicast service (MBMS) bearer of the at least one group call service, floor control information of the at least one group call service, or one or more user identifiers of the at least one group call service.

18. The UE of claim 12, further comprising:
means for receiving a map group to bearer message associated with the at least one group call service, wherein the means for establishing the at least one group call service is configured to establish the at least one group call service based at least in part on the received map group to bearer message; and
means for receiving an unmap group to bearer message associated with the at least one group call service, wherein termination of the at least one group call service is based at least in part on the received unmap group to bearer message.

19. The UE of claim 18, wherein at least one of the map group to bearer message or the unmap group to bearer message is received through a general purpose multimedia broadcast multicast service (MBMS) subchannel of the at least one group call service.

20. The UE of claim 18, wherein the unmap group to bearer message indicates at least one of a source type or a media type of the at least one group call service that is to be unmapped.

21. The UE of claim 18, wherein the map group to bearer message indicates a temporary mobile group identifier (TMGI) of the at least one group call service.

22. The UE of claim 12, further comprising:
means for receiving information associated with the broadcasted GDCH through another GDCH,
wherein the means for receiving, through the broadcasted GDCH, the list of the group call services and corresponding SDP information for establishing the group call services is configured to receive, through the broadcasted GDCH, the list of group call services and corresponding SDP information based on the information associated with the broadcasted GDCH received through the other GDCH.

23. A user equipment (UE) comprising:
a memory; and
at least one processor coupled to the memory and configured to:
receive, through a broadcasted group discovery channel (GDCH), a list of group call services and corresponding session description protocol (SDP) information for establishing the group call services;
determine at least one group call service of the group call services to receive; and
establish the at least one group call service based at least in part on the corresponding SDP information received through the broadcasted GDCH.

24. The UE of claim 23, wherein the reception, through the broadcasted GDCH, of the list of the group call services and corresponding SDP information for establishing the group call services is based on a TMGI associated with the broadcasted GDCH.

25. The UE of claim 24, wherein the at least one processor is further configured to:
send, to a server, a request including a uniform resource locator (URL) indicating a public land mobile network (PLMN); and
receive, based on the request, user service description (USD) information indicating the TMGI associated with the broadcasted GDCH.

26. The UE of claim 24, wherein the at least one processor is further configured to:
receive, through a service discovery channel, user service description (USD) information indicating the TMGI associated with the broadcasted GDCH.

27. The UE of claim 23, wherein the SDP information comprises a file associated with a service announcement for the at least one group call service.

28. The UE of claim 23, wherein the SDP information indicates at least one of an address associated with the at least one group call service, a port associated with the at least one group call service, a multimedia broadcast multicast service (MBMS) bearer of the at least one group call service, floor control information of the at least one group call service, or one or more user identifiers of the at least one group call service.

29. The UE of claim 23, wherein the at least one processor is further configured to:
receive information associated with the broadcasted GDCH through another GDCH,
wherein the reception, through the broadcasted GDCH, of the list of the group call services and corresponding SDP information for establishing the group call services is based on the information associated with the broadcasted GDCH received through the other GDCH.

30. A non-transitory computer-readable medium storing computer-executable code for wireless communication by a user equipment (UE), the non-transitory computer-readable medium comprising code to:
receive, through a broadcasted group discovery channel (GDCH), a list of group call services and corresponding session description protocol (SDP) information for establishing the group call services;
determine at least one group call service of the group call services to receive; and
establish the at least one group call service based at least in part on the corresponding SDP information received through the broadcasted GDCH.

* * * * *